United States Patent
McCloskey et al.

(10) Patent No.: US 8,553,791 B1
(45) Date of Patent: Oct. 8, 2013

(54) SIMULTANEOUS USE OF MULTIPLE RADIO FREQUENCY CHANNELS

(75) Inventors: E. Daniel McCloskey, San Jose, CA (US); C. Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/596,690

(22) Filed: Aug. 28, 2012

Related U.S. Application Data

(63) Continuation of application No. 12/904,762, filed on Oct. 14, 2010, now Pat. No. 8,259,830.

(60) Provisional application No. 61/251,490, filed on Oct. 14, 2009.

(51) Int. Cl.
*H04K 1/10* (2006.01)

(52) U.S. Cl.
USPC .......... 375/260; 375/147; 375/144; 375/130; 375/350; 700/293; 700/298

(58) Field of Classification Search
USPC ........................................ 375/260, 147, 144
See application file for complete search history.

(56) References Cited

U.S. PATENT DOCUMENTS

| | | | |
|---|---|---|---|
| 4,655,228 A | 4/1987 | Shimura et al. | |
| 5,142,692 A | 8/1992 | Owen | |
| 5,809,453 A | 9/1998 | Hunt | |
| 5,930,299 A | 7/1999 | Vannatta et al. | |
| 6,850,735 B2 | 2/2005 | Sugar et al. | |
| 7,149,239 B2 * | 12/2006 | Hudson | 375/144 |
| 7,203,472 B2 | 4/2007 | Seppinen et al. | |
| 7,397,840 B1 * | 7/2008 | Lillo | 375/147 |
| 2003/0198304 A1 | 10/2003 | Sugar et al. | |
| 2004/0028123 A1 | 2/2004 | Sugar et al. | |
| 2004/0047324 A1 | 3/2004 | Diener | |
| 2007/0001754 A1 | 1/2007 | Lakdawala et al. | |
| 2007/0142089 A1 | 6/2007 | Roy | |
| 2008/0268892 A1 | 10/2008 | Hamdi et al. | |
| 2009/0041087 A1 | 2/2009 | Yamasuge | |
| 2011/0118888 A1 * | 5/2011 | White, II | 700/293 |
| 2011/0163900 A1 | 7/2011 | Pagnanelli | |

OTHER PUBLICATIONS

Haykin, "Cognitive Radio: Brian-Empowered Wireless Communications." Feb. 2005, IEEE Journal on Selected Areas in Communications, vol. 23, No. 2, p. 201-220.

(Continued)

*Primary Examiner* — Eva Puente
(74) *Attorney, Agent, or Firm* — Fish & Richardson P.C.

(57) ABSTRACT

In general, the subject matter described in this specification can be embodied in methods, systems, and program products for identifying data that is designated for wireless transmission to a remote computing device. A digital signal that encodes the data for transmission across a band of radio frequency channels is generated.

Multiple radio frequency channels in the band that are available are determined. The digital signal is filtered to substantially reduce a power level of the digital signal at frequencies that correspond to channels in the band that have not been determined to be available. The filtered digital signal is converted to an analog signal. The analog signal is provided to an analog transmitter that isolates the band of channels to generate an isolated analog signal and that wirelessly transmits the isolated analog signal over the multiple available channels using one or more antennas.

20 Claims, 14 Drawing Sheets

(56) References Cited

OTHER PUBLICATIONS

'Internet.com-Webopedia' [online]."What is Channel Bonding?—A Word Definition From the Webopedia . . . ," 2002, [retrieved on Sep. 7, 2010]. Retrieved from the internet: <URL: http://www.webopedia.com/TERM/C/channel_bonding.html. 3 pages.

Jack et al., "Real Time Cepstrum Analysis Based on Saw Devices." Microwave Symposium Digest, 1997 IEEE MTT-S International, p. 324-327.

"Linear Technology." Linear Technology Corporation, 2006, 28 pages.

Min and Samueli. "Analysis and Design of a Frequency-Hopped Spread-Spectrum Transceiver for Wireless Personal Communications," IEEE Transactions on Vehicular Technology, vol. 49, No. 5, Sep. 2000, pp. 1719-1731.

Nyquist, "Certain Topics in Telegraph Transmission Theory," *Proceedings of the IEEE*, vol. 90, No. 2, Feb. 2002, pp. 280-305.

Unlicensed Operation in the TV Broadcast Bands vs. Additional Spectrum for Unlicensed Devices Below 900 MHz and in the 3 GHz Band. Second Report and Order and Memorandum Opinion and Order, Before the Federal Communications Commission, Washington, D.C. 20554. Federal Communications Commission, FCC 08-260, Nov. 14, 2008, 130 pages.

* cited by examiner (a)

| Inputs: | SPDT ⟋ | Filter ≋ | LNA ▷ | Dig. Atten ⌇ | Amp ▷ | Filter ≋ | Amp ▷ | A/D |
|---|---|---|---|---|---|---|---|---|
| Gain (dB) | -0.5 | -2 | 13.5 | -2 | 21 | -2 | 13.5 | A/D |
| NF (dB) | 0.5 | 2 | 3 | 2 | 4 | 2 | 3 | |
| IIP3 (dBm) | 50 | 52 | 30.5 | 52 | 18 | 52 | 30.5 | |
| OIP3 (dBm) | 50 | 50 | 44 | 50 | 39 | 50 | 44 | |
| SFDR (dB) | | | | | | | | 59 |
| Calculations: | | | | | | | | |
| Cascaded G | -0.5 | -2.5 | 11 | 9 | 30 | 28 | 41.5 | |
| Cascaded NF | 0.50 | 2.50 | 5.50 | 5.56 | 5.78 | 5.78 | 5.78 | |
| Cascaded IIP3 | 50.50 | 48.38 | 32.88 | 32.25 | 8.98 | 8.77 | 1.58 | |
| Cascaded OIP3 | 50.00 | 45.88 | 43.88 | 41.25 | 38.98 | 36.77 | 43.08 | |
| SFDR | 89.33333 | 95.90332 | 83.57016 | 83.11773 | 67.45223 | 67.31084 | 62.51709 | |

(b)

| Inputs: | SPDT ⟋ | Filter ≋ | LNA ▷ | Dig. Atten ⌇ | Amp ▷ | Mixer ⊗ | Amp ▷ | Filter ≋ | Amp ▷ | A/D |
|---|---|---|---|---|---|---|---|---|---|---|
| Gain (dB) | -0.5 | -2 | 13.5 | -2 | 21 | -7.5 | 21 | -2 | 21 | A/D |
| NF (dB) | 0.5 | 2 | 3 | 2 | 4 | 7.5 | 4 | 2 | 4 | |
| IIP3 (dBm) | 51 | 52 | 30.5 | 52 | 18 | 35 | 18 | 102 | 18 | |
| OIP3 (dBm) | 50.5 | 50 | 44 | 50 | 39 | 27.5 | 39 | 100 | 39 | |
| SFDR (dB) | | | | | | | | | | 74 |
| Calculations: | | | | | | | | | | |
| Cascaded G | -0.5 | -2.5 | 11 | 9 | 30 | 22.5 | 30 | 20.5 | 41.5 | |
| Cascaded NF | 0.50 | 2.50 | 5.50 | 5.56 | 5.78 | 5.79 | 5.78 | 5.79 | 5.81 | |
| Cascaded IIP3 | 51.00 | 48.68 | 32.88 | 32.26 | 8.98 | 3.54 | 8.98 | 3.54 | -3.47 | |
| Cascaded OIP3 | 50.50 | 46.18 | 43.88 | 41.26 | 38.98 | 26.04 | 38.98 | 24.04 | 38.03 | |
| SFDR | 97.90549 | 95.02233 | 82.49483 | 82.04167 | 66.37147 | 62.74075 | 62.73824 | 58.05848 | | |

FIG. 16

SIMULTANEOUS USE OF MULTIPLE RADIO FREQUENCY CHANNELS

CROSS-REFERENCE TO RELATED APPLICATIONS

This application claims priority to U.S. application Ser. No. 12/904,762 filed Oct. 14, 2010 entitled "Simultaneous Use of Multiple Radio Frequency Channels", which claims priority to U.S. Provisional Application Ser. No. 61/251,490, filed on Oct. 14, 2009, and entitled, "Simultaneous Access to Multiple Radio Frequency Channels," the entire contents of which are incorporated herein by reference.

TECHNICAL FIELD

This document generally relates to wireless communication.

BACKGROUND

In telecommunications, specific frequencies or ranges of frequencies can be allocated as channels for use by broadcasting services in different areas. Each channel can be a specific radio frequency or band of frequencies that is usually named with a letter, number, or codeword, and is allocated by international agreement or governing body. For example, the television channel 2 in North America references the broadcast band of frequencies between 54 and 60 MHz.

The electromagnetic spectrum that mobile computing devices use for wireless communication is treated as a precious resource. Governments control where in the spectrum particular wireless technologies can operate, and also control who can use particular portions of the spectrum (e.g., through high-cost spectrum auctions). Thus, various mechanisms are used to maximize the data that a network of mobile computing devices and corresponding base stations can exchange in a particular portion of spectrum.

"White spaces" include those frequencies that are assigned to specific channels, but are not in use at a particular location. For example, frequencies that are assigned to an otherwise active channel may not serve to transmit data, but may serve as a guard band between other channels that can be made available for use by a third party communication device. Some frequencies or bands of frequencies are not being used at a particular location, or have recently become available for use as television stations have switched from analog transmissions to digital transmissions.

Spatial division multiple access (SDMA) is a mechanism that is used to increase the amount of data exchanged in a wireless network. In SDMA systems, users are multiplexed in the spatial domain so that multiple users can broadcast and receive from different spatial degrees of freedom. For example, several mobile computing devices can communicate with the same base station at the same time and over the same band of frequencies if the devices are geographically separated (i.e., if the devices are located in different spatial degrees of freedom). As one example, two simultaneously-communicating devices may be located on opposite sides of a broadcast and reception tower for a system. SDMA can be achieved in a network using an array of antennas that can adapt signals radiating from a base station in the direction of a client device (e.g., using transmit and receive beamformers). Additionally, an SDMA system can be configured and deployed for time division multiple access (TDMA), by which multiple client devices that are geographically located near each other can share the same spatial-frequency resource by having each device transmit or receive only during certain slices of time that are coordinated with each other.

Modern wireless data communication systems provide bandwidth for use by rich computing applications on mobile devices. For example, users of wireless devices such as smart phones can make telephone calls, receive emails, and even receive full motion audio/video broadcasts on their mobile devices. Every time a great new service is offered, users of wireless devices consume data associated with the service, requiring more and more bandwidth. As a result, the airwaves are filled with data going to and from an increasing number of wireless computing devices that each require growing amounts of data.

SUMMARY

This document describes techniques, methods, systems, and mechanisms for simultaneous use of multiple radio frequency channels. In general, a wireless communication system may transmit a stream of data over multiple non-adjacent radio frequency channels. For example, the system may determine which of multiple radio frequency channels in a predetermined portion of wireless spectrum are available (e.g., are not presently being used by third-party devices). The system may then transmit and receive over the available channels. A transmission of data to a single device may include application of a pseudorandom sequence to the data to spread the energy of the data signal over a wider frequency range.

A digital filtering system may remove the frequency components that correspond to the unavailable channels. The resulting signal may be converted from digital to analog, and a front-end analog transceiver may pass the predetermined portion of wireless spectrum through the front-end without filtering the signal on a single-channel basis. The analog transceiver may translate the analog signal from baseband to frequency for transmission.

The wireless communication system may receive data over multiple radio frequency channels in a similar manner. For example, the front-end analog transceiver may receive wireless energy over a broad range of frequencies and pass through the predetermined portion of wireless spectrum. The passed through portion may be converted from analog to digital, and a digital filtering system may remove the frequency components that correspond to the unavailable channels in order to extract data that is being transmitted over the available channels.

In general, one aspect of the subject matter described in this specification can be embodied in a computer-implemented method for providing simultaneous use of multiple radio frequency channels. The method includes identifying data that is designated for wireless transmission to a remote computing device. The method includes generating a digital signal that encodes the data for transmission across a band of radio frequency channels. The method includes determining multiple radio frequency channels in the band that are available. The method includes filtering the digital signal to substantially reduce a power level of the digital signal at frequencies that correspond to channels in the band that have not been determined to be available. The method includes converting the filtered digital signal to an analog signal. The method includes providing the analog signal to an analog transmitter that isolates the band of channels to generate an isolated analog signal and that wirelessly transmits the isolated analog signal over the multiple available channels using one or more antennas.

Another aspect of the subject matter described in this specification can be embodied in a computer-implemented method for providing simultaneous use of multiple radio frequency channels. The method includes receiving with an antenna a radio frequency signal. The method includes filtering the signal by isolating a band of multiple radio frequency channels to generate an isolated band of channels. The method includes digitizing the isolated signal to form a digital signal, wherein the digital signal includes data that identifies characteristics of each channel in the band. The method includes presenting the digital signal to a digital signal processing device, so that the digital signal processing device can process any or all channels of the band.

In yet another aspect, the subject matter described in this specification can be embodied in a system for providing simultaneous use of multiple radio frequency channels. The system includes a spectrum sensor to determine multiple radio frequency channels that are available in a band of radio frequency channels. The system includes a power spreading device to generate an outbound digital signal that encodes across the band of radio frequency channels data that is designated for wireless transmission. The system includes a digital masking system to substantially remove components of the outbound digital signal that correspond to channels in the band that have not been determined to be available in order to generate an outbound filtered digital signal. The system includes a digital to analog converter to convert the outbound filtered digital signal to an outbound analog signal. The system includes an analog transmitter to isolate the band of channels in the outbound analog signal in order to form an outbound isolated analog signal, and to transmit the outbound isolated analog signal over the multiple available channels using one or more antennas.

These and other aspects can optionally include one or more of the following features. The analog transmitter may transmit the isolated analog signal simultaneously over each of the multiple available channels. The analog transmitter may not isolate one or more individual channels within the band of channels in forming the isolated analog signal. The analog transmitter may not isolate a portion of the band of channels from another portion of the band of channels in forming the isolated analog signal.

Substantially reducing the power level of the digital signal may include filtering the digital signal so as to generate a power difference of 55 db between (i) a maximum average power in a 100 kHz portion of a first band that is adjacent to a second band, and (ii) a maximum average power in a 100 kHz portion of the second band, wherein the first portion is adjacent to the second portion. Substantially reducing the power level of the digital signal may include filtering the digital signal so as to generate a power difference of 72.78 db between a full power of a first band, integrated over a bandwidth of the band, and a power measure in a first 100 kHz of second band that is adjacent to the first band.

Each channel may be a range of radio frequencies that is allocated by an international agreement or a governing body for transmission by an entity. Each channel may be an Ultra High Frequency (UHF) channel designated by the United States Federal Communication Commission. The band of channels may be a band of UHF channels 21-35 or 39-51. The band of channels may be a contiguous band of radio frequency. The multiple available channels may be discontiguous within the band. The multiple available channels may include at least three non-adjacent bands of radio frequency, and wherein each of the at least three non-adjacent bands of radio frequency may include two or more adjacent channels.

The method may include determining multiple radio frequency channels in the band that are available by receiving with an antenna a first radio frequency signal. The method may include determining multiple radio frequency channels in the band that are available by identifying, as the multiple radio frequency channels that are available, those channels in the band over which the first radio frequency signal does not have a power level that exceeds a predetermined threshold power level. Identifying those channels over which the first radio frequency channel signal does not have a power level that exceeds a predetermined power level may include applying a Fast Fourier Transform across an entire amount of the band.

The method may include determining multiple radio frequency channels in the band that are available. The method may include processing the digital signal by filtering the digital signal to substantially reduce a power level of the digital signal at frequencies that correspond to channels in the band that have not been determined to be available. The method may include processing the filtered digital signal to identify a stream of data that was encoded across the radio frequency channels that are available. Processing the filtered digital signal may include performing a direct sequence spread spectrum decoding process to extract a single, serial stream of data.

The system may include an analog receiver to filter an inbound radio frequency signal to isolate the band of multiple radio frequency channels in order to generate an inbound isolated analog signal. The system may include an analog to digital converter to receive the inbound isolated signal and to digitize the inbound isolated signal in order to form an inbound digital signal. The system may include a digital signal processor to receive the inbound digital signal and to process all of the available channels in the band. The spectrum sensor may periodically determine a new set of multiple channels in the band that are available and, in response to each determination of a new set of multiple channels in the band that are available, the digital filtering system may substantially remove components of the outbound digital signal that correspond to channels in the band that have not been determined to be in the new set of multiple channels in the band that are available.

Particular embodiments can be implemented, in certain instances, to realize one or more of the following advantages. The system may dynamically utilize unused portions of wireless spectrum. Thus, unused wireless spectrum may aid wireless communication with mobile devices instead of lying dormant. Further, the use of large portions of wireless spectrum may allow the system to operate at a low power level, reducing noise between spatial degrees of freedom and system noise, as seen by third-party devices. The per-channel filtering may be performed digitally, and because DSP processing capability may improve at a faster rate than that of radio frequency filters and mixers, DSP channelization may provide great possibilities in the future. Moreover, providing to a digital signal processing device an entire band of multiple channels reduces filtering requirements The details of one or more embodiments are set forth in the accompanying drawings and the description below. Other features, objects, and advantages will be apparent from the description and drawings, and from the claims.

DESCRIPTION OF DRAWINGS

FIG. 16 is a chart showing a spurious free dynamic range analysis.

Like reference symbols in the various drawings indicate like elements.

DETAILED DESCRIPTION

Figure 1:
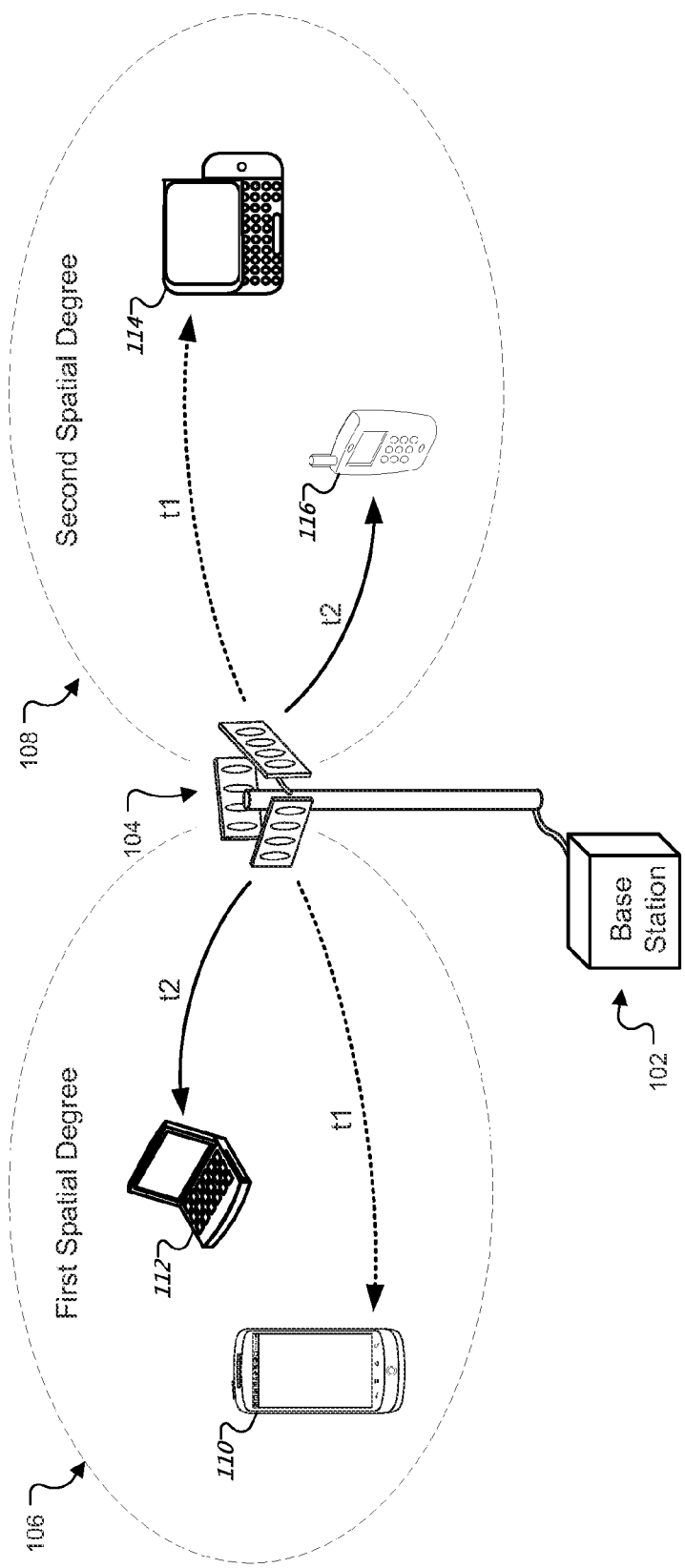
FIG. 1 is an example of a base station that is configured to communicate with multiple mobile computing devices using a multiple-input multiple-output (MIMO) communication system.

This document describes techniques, methods, systems, and mechanisms for simultaneous use of multiple radio frequency channels. In general, this document describes a system that is capable of dynamic spectrum use across a band of frequencies at high data rates to enable use of unoccupied spectrum in the band of frequencies. In some implementations, the system performing these functions is a "whitespace device" that can identify and use discontiguous portions of unoccupied spectrum in the band. The device can include an analog front-end that can pass the entire band through to a digital processing device as a single channel, so as to enable the digital signal processing device to perform any channelization digitally.

A single base station employing the described wireless communication system may be used to provide a large number of wireless computing devices at one time (e.g., 10,000 devices) with wireless internet connectivity. Thus, a geographically dispersed network of fifty base stations may serve users of an entire metropolitan area. Numerous features of the system enable network access by such a large number of computing devices. The communication system may use time division multiple access (TDMA) to broadcast to separate groups of the wireless computing devices at a particular time. The single base station may transmit to a particular group of the devices at a particular time over a same frequency band by using spatial division multiple access (SDMA). In SDMA, a group of mobile devices are multiplexed in the spatial domain so that the group of devices can broadcast to and receive from the base station from different spatial degrees of freedom.

Thus, the base station may transmit, during a particular time period and towards a particular spatial region (out of multiple spatial regions to which the base station is simultaneously transmitting), a stream of data for a single mobile computing device that is geographically located in the particular spatial region, which may be an angular band of a certain number of degree of compass direction. The stream of data may have been spread among portions of a frequency band using direct sequence spread spectrum (DSSS) techniques. For example, the frequency band may include a band of television channels, and the portions of the band may include those channels that are presently available (e.g., those channels that third-party devices are not broadcasting over). The transmission over the channels that are presently available may be simultaneous. In other words, the transmission may be of a single time-varying signal that includes frequency components for all frequencies in the band. In some examples, frequency components for all the frequencies in the band are found within a single time period that is an inverse of the lowest frequency in the band (i.e., a time period of a single cycle of the lowest frequency in the band).

The channels that are available within the band may be discontinuous. In other words, at least two of the available channels may be non-adjacent due to the presence of an occupied channel between the available channels. The available channels, even if discontiguous, may provide a large swath of bandwidth for transmission to any particular mobile device at a given time. The use of such a large bandwidth allows transmission at a reduced power level. Thus, the system may be designed to operate as a low signal-to-interference ratio (SIR) system (e.g., below 0 dbm). A low SIR system can reduce interference to neighboring cells and thus may be more robust against interference from devices that are under the network's control. Further, use of DSSS techniques across such a wide bandwidth and at such a low SIR ratio may allow system communications to appear as noise to third-party devices.

As an illustration, a wideband transceiver architecture can provide a band of several UHF channels to a digital signal processing device for sensing activity within the available band. Specifically, the wideband transceiver architecture can receive an analog signal over an antenna. The architecture can include a filter that isolates frequencies from the band of UHF channels 21-35 and the band of UHF channels 39-51 from all frequencies in the received analog signal. In some implementations, a first filter isolates frequencies from the band of UHF channels 21-35 to generate a first filtered signal and a second filter isolates frequencies from the band of UHF channels 39-51 to generate a second filtered signal. Isolating a band of frequencies in a signal can include filtering the signal to remove frequency components from the signal that do not correspond to the band that is being isolated.

The filtered signal or signals are then converted to digital signals by one or more analog-to-digital converters. In some implementations, the analog-to-digital converters sample the filtered signals at approximately 244.4 MHz without mixing the filtered signals to a lower frequency. The sampled signals are then provided to one or more digital signal processing (DSP) devices that can simultaneously sense which channels are available for use. For example, a DSP can apply a fast Fourier transform (FFT) across the band in order to detect power levels at various frequencies. If a power level for a portion of the spectrum (e.g., a channel) does not surpass a threshold power level, the portion of the spectrum may be identified as unallocated and available for use by the system.

In various examples, the identification of available and unavailable channels is determined on a channel-by-channel basis (e.g., where each channel represents a 6 MHz portion of bandwidth). For example, UHF channels 21-24, 26, 29-33, 39-44, and 50 may be determined to be available. A channel may be determined to be available if each of the FFT data points within the channel falls beneath a threshold (e.g., where the values for each of the bins for a particular 6 MHz portion of bandwidth fall below a threshold power level), or where an average of FFT data points within the channel falls beneath a threshold.

The described system may use the available portions of bandwidth for communication between a base station and multiple mobile devices. For example, the base station may have queued a stream of data for transmission to each of multiple mobile devices. Using DSSS techniques, a pseudorandom sequence may be multiplied against each stream of data to spread the energy of each original signal from a given frequency bandwidth into a wider bandwidth. Using TDMA techniques, a portion of the data streams may be selected for transmission at a given time.

Each stream of data that is selected for transmission at a given time may undergo spatial precoding so that the data stream is transmitted by an array of antennas. The array of antennas effectively work as a team to create a pattern of constructive and destructive interference in the wavefront to reinforce a signal strength for the data stream in a particular direction and suppress the signal strength in undesired directions. Accordingly, a spatial precoder receives the data stream as an input signal and provides precoded signals to multiple channelizing circuits, one channelizing circuit for each antenna in the array.

A channelizing circuit may receive a precoded digital signal and pass the precoded digital signal to a DSP. The DSP may convert the precoded digital signal to the frequency domain by performing a fast Fourier transform (FFT) on the precoded digital signal. The converted signal may occupy a broad portion of bandwidth. Thus, the DSP may apply a mask of one or more filters to pass through the bandwidth segments that fall within the available band of UHF channels (e.g., the frequencies that fall inside of UHF channels 21-35 and 39-51). The DSP may also apply the mask to "notch out" those channels that have been determined to be unavailable (e.g., because the DSP sensed power level in the channel above a threshold power level). Notching out the channels may include substantially reducing the power of the signal at frequencies that correspond to the band.

In some examples, a substantial reduction can include masking a channel so that a power level between (i) a maximum average power in a 100 kHz portion of a first 6 mHz television channel band that borders a second television channel, and (ii) a maximum average power in a 100 kHz portion of the second 6 mHz television channel that borders the first television channel is 40 db, 45 db, 50 db, 55 db, or 60 db. A substantial reduction can include a 72.78 dB difference between a full power of a channel that the system is using, integrated over the full 6 mHz of the channel, and the power measured in the first 100 kHz of the adjacent channel.

Thus, the DSP may have filtered the precoded signal for each channelizing circuit so that the power of the filtered signals that collectively represent the data stream are spread out over the available channels. An inverse FFT may be performed on the filtered signal to convert the signal to the time domain. The converted signal may be provided to a digital-to-analog converter, which generates an analog representation of the digital signal which has been filtered. The analog representation of the signal is fed to the analog front-end for transmission over one or more antennas. As described throughout this document, the analog front-end applies a low pass filter to isolate the baseband. The baseband is then mixed up to a higher frequency range. The signal at the higher frequency may be split into two signals, where a first of the signals is filtered to occupy only UHF channels 21-25, and a second of the signals is filtered to occupy only UHF channels 39-51.

After identifying specific channels that are available for communication, the system may simultaneously receive data over the identified channels. For example, a single DSP can use a single transceiver architecture and alternate between transmitting and receiving data using the architecture. When receiving data, the transceiver front-end may pass through a band of channels to a DSP, which can notch out unavailable bands and identify the data that is represented by the signal that is being transmitted over the remaining spectrum.

The described system can be different than heterodyne systems that channel hop instead of receiving and transmitting over several channels at once. More specifically, instead of an architecture that serially provides single channels to a DSP, the described system can provide the entire UHF bandwidth to a DSP (or alternatively the UHF low band of channels 21-35 to a first DSP and the UHF high band of channels 39-51 to a second DSP). A channel-select filter need not be used in cooperation with a mixer and synthesizer. Providing the entire band to the DSP can be faster than jumping serially between each channel to either receive information or transmit information.

Further, the described system can also be different than systems that perform channel bonding. More specifically, while channel bonding may include using several discrete radios over several discrete channels and bonding the channels together, the described system can use a single radio to access data across several discontiguous channels. For example, a single DSP may access multiple discontinguous channels that the DSP determined were available. The same DSP may later sense that a different set of discontinguous channels are available, and may utilize the different set of discontinguous channels for communication.

FIG. 1 is an example of a base station that is configured to communicate with multiple mobile computing devices using a multiple-input multiple-output (MIMO) communication system. An actual network may include multiple base stations, but a single base station transmitting tower 102 is illustrated in FIG. 1 for purposes of clarity and simplification. In some implementations, the base station 102 includes an array of antennas 104. The radio antennas couple electromagnetic energy from one medium, space, for example, to another, such as wire, coaxial cable, or a waveguide.

In some implementations, the base station communicates with multiple client devices on the same time-frequency resource through spatial separation with the antenna arrays, a practice known as spatial division multiple access (SDMA). In other words, with SDMA an antenna array can form multiple spatial channels to allow several communication links to share the same time-frequency resources. SDMA architecture can enable the channeling of radio signals based on a client device's location. Each spatial channel may include a directional range of the base station's periphery.

As an illustration, mobile computing devices 110 and 112 are in a first spatial degree of freedom 106, and mobile computing devices 114 and 116 are in a second spatial degree of freedom 108. Accordingly, the base station 102 may transmit, at the same time and over the same band of frequencies, separate data streams to the first spatial degree 106 and the second spatial degree 108.

Although two spatial degrees of freedom are illustrated in FIG. 1, the system described in this document may communicate using more than two spatial degrees of freedom, for example, forty spatial degrees of freedom at a given time. In various examples, each of the antennas in antenna array 104 transmits and receives for a particular spatial degree of freedom. In other words, a direction of transmission may be determined by a property of the antenna design itself. In other examples, the antennas work together using beamforming techniques to direct communications to multiple spatial degrees of freedom. Accordingly, the antenna array for base station 102 includes multiple antennas (e.g., 40 antennas).

The benefits of multiplexing users in the spatial domain can include increasing a quantity of devices that can communicate with the base station 102 at a given time, extending the range of communication possible between a client device and a base station, and receiving less destructive effects of multipath signals (e.g., those signals that bounce off buildings).

Additionally, the base station 102 can employ one or more dynamic time division multiple access (TDMA) protocols to communicate with multiple wireless client devices over a single frequency and within a single spatial channel. The TDMA protocol allocates slices of time during which certain of the devices in a spatial channel will transmit and/or receive information, while the other devices wait their turn. Communications within this structure can occur in repeating structures known as frames of information, where each frame may have a defined structure. Frames are, among other things, constructs whose defined structure is understood by both wireless devices and base stations, so that each device knows when it is allowed to communicate and what data should be communicated during a particular time slice. During portions of a frame, a client device may be permitted to transmit, receive, or wait and listen. The general structure and function of frames is well-known.

Transmission time in the network can be divided into uplink and downlink times. In some implementations, the amount of time devoted to uplink and downlink can be equal. In other implementations, time can be split between uplink and downlink times using a relatively arbitrary ratio. For example, two-thirds of time can be allocated for uplink time and one-third of time can be allocated for downlink time.

As an illustration, mobile computing devices 110 and 114 may "listen" for data that is transmitted from the base station 102 during a time period "t1," while mobile computing devices 112 and 116 may listen for data during a time period "t2." Although uplink time slices are not illustrated in FIG. 1, such time slices could be illustrated with arrows traveling from the mobile computing devices to the server system, for example, during time periods "t3" and "t4." Further, although the first and second spatial degrees of freedom each include two devices, multiple additional devices may reside in each geographical degree of freedom and still use the communication system. In some implementations, the combination of SDMA and TDMA allows base station 102 to communicate with approximately 10,000 client devices.

Accordingly, during a given period of time, the base station 102 may transmit to or receive from a set of mobile computing devices that are geographically located in different spatial degrees of freedom. Further, the communication with the computing devices may occur using a same discontiguous swath of electromagnetic spectrum.

In some implementations, base station 102 communicates with the mobile devices over the so-called television whitespace frequencies. In some implementations, the base station 102 communicates over the range of frequencies between about 50 MHz to about 700 MHz. In some implementations, the base station 102 communicates over the range of frequencies between about 54 MHz to about 806 MHz. In some implementations, the base stations 102 and 104 can communicate over the range of frequencies between about 698 MHz to about 806 MHz. In some implementations, the base stations operate over frequencies from UHF channels 21-35 (512-602 MHz) and channels 39-51 (620-698 MHz).

The base station and wireless devices may treat either or both sets of UHF channels as a single swath of spectrum, and may treat the single swath of spectrum as a single frequency band. The swath of spectrum, however, may include non-contiguous portions of the electromagnetic spectrum. As described in more detail later, the communication system may be able to determine which of the channels in the television white-space frequencies are available, and may communicate with each particular mobile computing device over the range of channels that are available.

Transmitting over a large amount of bandwidth, for example, up to 168 MHz for the above-described UHF channels, allows transmitting at a low power at any given frequency because the power may be spread across the larger bandwidth. Accordingly, the system may be designed to be a low signal-to-interference ratio (SIR) system. A low SIR system can be a system where the ratio of the strength of signals received at the base station and at client devices to the strength of undesired signals (noise and interference) is low. Thus, signals will not be transmitted with as much power as in a high SIR system. A low SIR system can reduce interference to neighboring cells. In some implementations, the described system can operate below 0 dbm and may be able to operate down to −15 dbm. In some examples, the described system operates below the noise level in cooperation with DSSS techniques, and the signal is despread by a receiving device using the key specified used in the DSSS spreading operation.

A system designed to be low SIR can be more robust against interference from devices that are not under the network's control. Thus, viewing a specific client device in a MIMO system can be much easier in a low SIR system as the interference from one spatial degree of freedom to another may be reduced. Further, with less potential of interference from other spatial degrees of freedom, the channel estimations may not need to be as accurate. Additionally, a low SIR system may be more robust to interference from devices that are not under the network's control. This benefit may be especially important when using unlicensed spectrum where devices may use the spectrum without exclusivity (e.g., when operating in the unlicensed TV whitespace spectrum).

The base station 102 is configured to communicate with a variety of wireless devices. For example, the base station 102 can communicate with personal computers, laptop computers, cellular phones, personal digital assistants, pagers, video game consoles, and other wireless computing devices such as netbooks. The network can be designed to leverage TCP/IP as much as possible so that voice, data, etc. is encoded in IP.

In some implementations, a particular client device can be located simultaneously within geographic coverage areas that are served by multiple base stations. In such circumstances, the wireless device is capable of communicating with either base station (or it could communicate with both). In some implementations, the wireless device 112 can elect to associate with the base station that has the strongest signal at the location of the wireless device. In some implementations, the wireless device can elect to associate with the base station that has the best signal-to-noise ratio.

Figure 2:
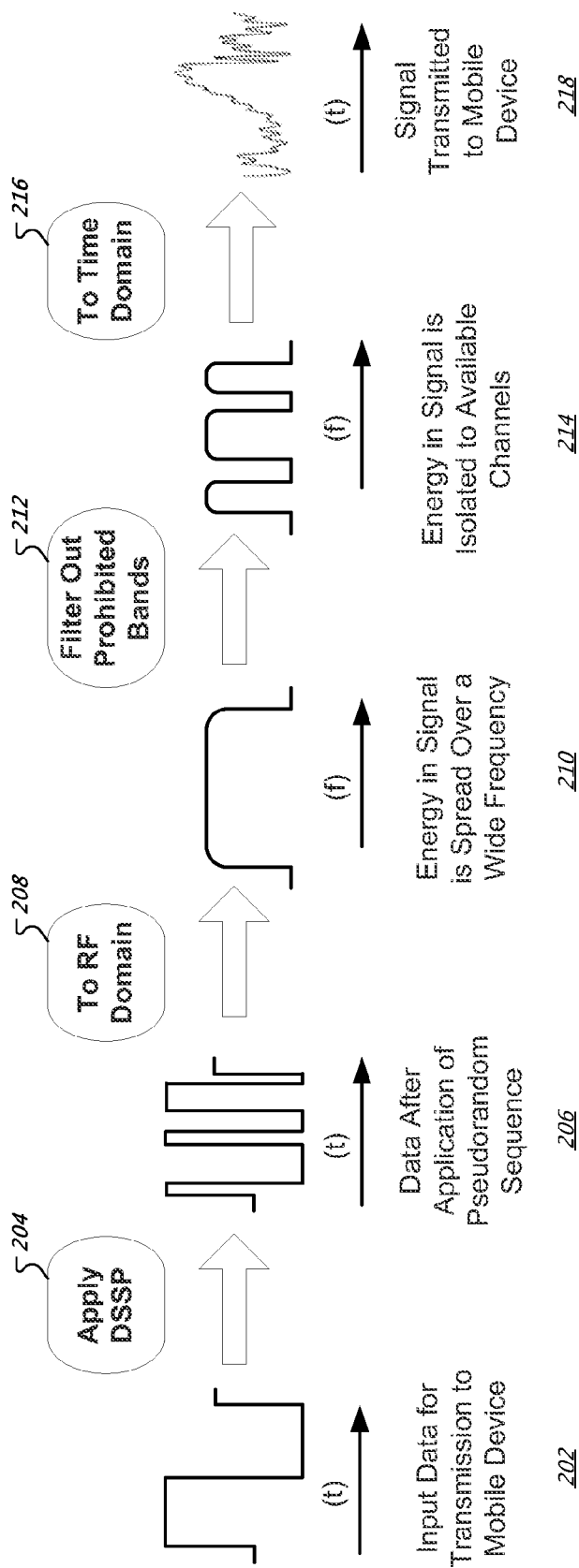
FIG. 2 is an example of a transmission of data between a base station and a mobile computing device.

FIG. 2 is an example of a transmission of data between a base station and a mobile computing device. This example illustrates the transmission of data to a single of the mobile computing devices 110-116. As described above with reference to FIG. 1, data may be transmitted to multiple devices during a same time period based on the devices being geographically located within different spatial degrees of freedom. Thus, in some examples, the process described with reference to FIG. 2 is performed for each of multiple separate streams of data that are transmitted during a particular time period (where each stream of data may be precoded across the same antenna array).

The input data 202 may be data that is queued for transmission to a single of multiple devices that are served by a base station. For example, a user of a mobile computing device may have accessed the internet using a web browser, and requested that a website stream a video to his mobile telephone. In response, data that represents the content of the video may be transmitted over the internet to the base station, which queues the data for transmission in various time slots to the mobile computing device.

At box 204, a Direct Sequence Spread Spectrum (DSSS) process is applied to the input data 202, or a portion thereof that is designated for transmission in a time slot. The DSSS process multiplies the data being transmitted by a "noise" signal. The noise signal is a pseudorandom sequence of values at a frequency that is higher than the frequency of the original signal, thereby spreading the energy of the original signal into a wider band and generating a stream of modified data 206. This "spreading" of the input signal can be decoded by the receiving device, if the receiving device uses the same noise signal in a "dispreading" operation. The noise signal is sometimes referenced as the "key," "code" or "pseudo-random number" (PRN).

At box 208, the modified digital data signal 206 is transformed from the time domain to the frequency domain. For example, a digital signal processor may apply the fast Fourier transform (FFT) algorithm to compute the discrete Fourier transform of the signal. The output of the FFT algorithm may identify an amplitude of a frequency component for each of multiple frequency ranges, or bins. In this example, signal 210 represents the energy level of the signal 206 when transformed to the frequency domain. As illustrated in FIG. 2, signal 210 depicts energy over a large frequency range. Should the input data signal 202 have been transformed to the frequency range without performing a spreading operation, the energy may be spread over a narrower frequency range.

At box 212, a filter is applied to the energy in the signal 210 to notch out those frequency channels that are unavailable for use by the communication system. For example, the DSP may receive from a spectrum sensor an identification of which of multiple UHF channels the DSP may transmit over. The DSP may apply a filter that provides a pass through for the allowed channels, with a 60 dB cut off for the disallowed frequencies. In various examples, a transition between adjacent allowed channels may not be notched out.

At box 216, the signal 214 is transformed back to the time domain. For example, the DSP may apply the inverse FFT algorithm to generate a signal 218 that is the time domain representation of the signal 214. The signal 218 may be provided to an analog front-end of a communication system for transmission over one or more antennas.

In various examples, the operations of boxes 208, 213, and 216 are performed by a collection of circuits that each act upon an instance of the digital data signal 206 that has been precoded for transmission over one of multiple antennas in an array. In other words, the modified digital data signal 206 may be precoded into multiple precoded data signals that collectively represent the digital data signal 206. Each precoded data signal may be separately transformed into the frequency domain (box 208), filtered (box 212), and transformed back to the time domain (box 216).

Figure 3:
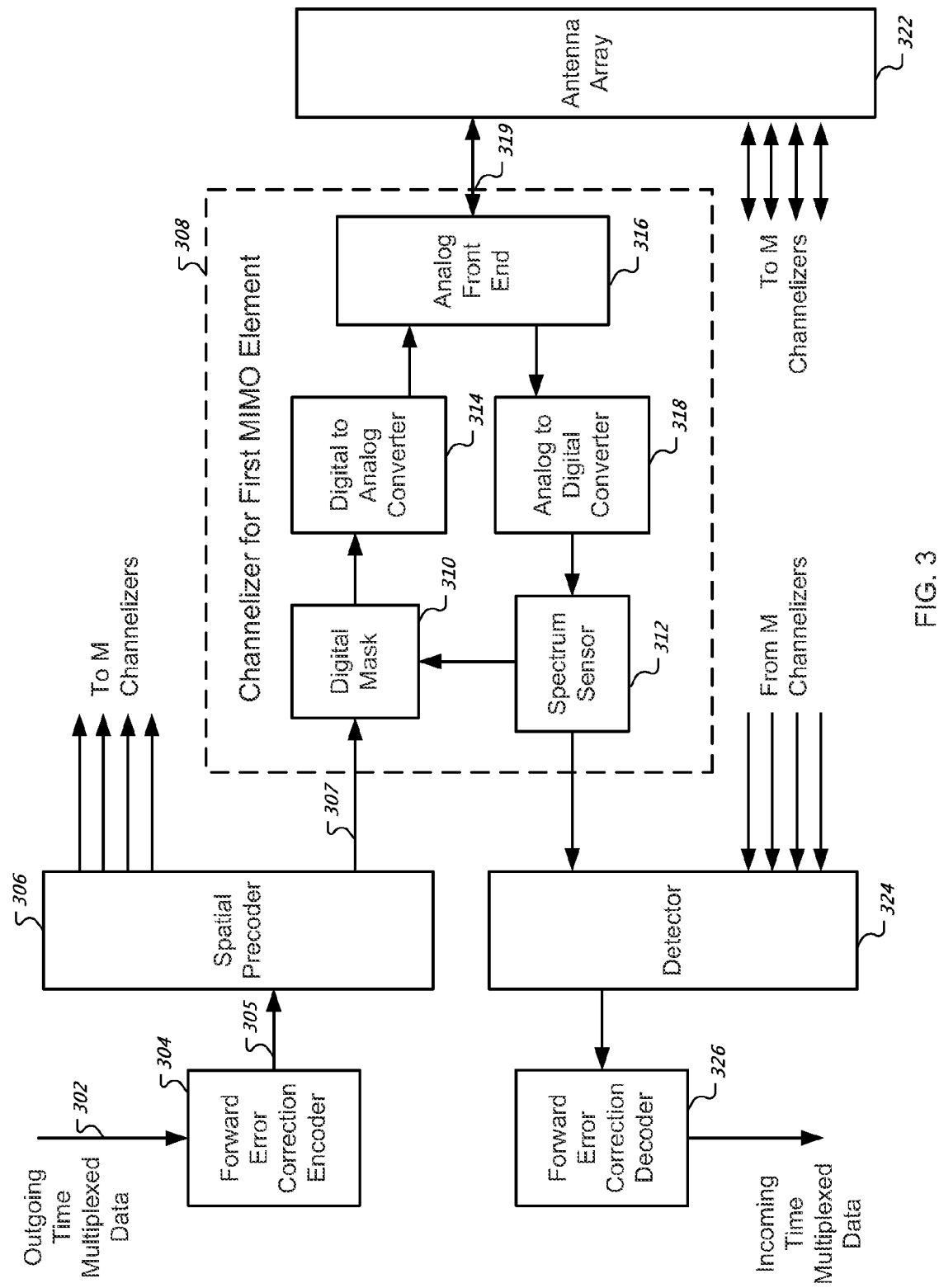
FIG. 3 is an example of a base station communication system for communicating with multiple mobile computing devices.

FIG. 3 is an example of a base station communication system for communicating with multiple mobile computing devices. The system receives an outgoing time multiplexed data signal 302 of information that is to be transmitted to a mobile device during a particular time slot. A time multiplexer (not shown) has already selected the outgoing data signal 302 for transmission during the particular time slot from among multiple data signals that that are queued for transmission to multiple computing devices (and which will be transmitted during different time slots).

The data signal 302 is provided to a forward error correction encoder 304. The correction encoder 304 may improve data reliability by introducing a known structure into the data signal 302 prior to transmission. This structure enables a receiving system to detect and possibly correct errors caused by corruption from the channel and the receiver. As the name implies, this coding technique enables a decoder 326 to correct errors without requesting retransmission of the original information.

In some examples, the forward error correction encoder performs a Direct Sequence Spread Spectrum (DSSS) process on the data signal 302. The DSSS process multiplies the data being transmitted by a "noise" signal to spread the energy of the original signal into a wider band. In other examples, a DSSS process has already been applied to the data signal 302 (e.g., before the time multiplexing).

The encoded data signal 305 that is output from the forward error correction encoder 304 is provided to a spatial precoder 306. As described throughout this document, the communication system may transmit, at the same time and over the same frequency resources, distinct data streams to multiple different users that are in different spatial dimensions. Transmitting an encoded stream of data 305 to a particular spatial dimension (and not to other spatial dimensions) can be performed by precoding the stream of data 305 for transmission over multiple antennas. The precoding can change the phase and relative amplitude of the signal that is to be transmitted by each of the antennas in order to create a pattern of constructive and destructive interference in the wavefront (e.g., using beamforming techniques).

In various examples, the spatial precoder 306 receives multiple encoded data streams 305 that are each designated for transmission to a specific spatial degree of freedom. The spatial precoder 306 may precode each of the received signals 305 for transmission by all of the antennas in the array. In other words, the antenna array may transmit to a plurality of mobile devices at a single time, and each antenna in the array may transmit signals for multiple devices at a single.

Each output of the spatial precoder 306, is connected to a channelizer circuit. For instance, a single output signal 307 is illustrated as being transmitted to a channelizer 308, which is for the precoded signal that is being transmitted by one of the antennas in the array. The channelizer 308 includes a digital mask 310, which performs a filtering operation on the output signal 307 to remove frequency components from the signal 307 that are disallowed, for example, to leave those frequency components of available channels.

In some examples, the channelization is performed by converting the input signal 307 from the time domain to the frequency domain, for example, with an FFT algorithm. Once the signal is converted to the frequency domain, the digital mask 310 filters the signal so that the signal only includes power that is above a specified threshold for specific channels. For example, there may be a 55 dB isolation between channels.

Thus, a frequency domain representation of the signal 307, after the disallowed frequencies have been filtered out, may appear to include multiple distinct bands, where narrow bands may represent a single available channel, and wide bands may represent two or more available channels. Similarly, the "notches" or valleys between the bands may represent one or more channels that are unavailable to the system because a third-party system is broadcasting over the channels. In various examples, power is allowed to pass through channels at baseband and, as described in more detail throughout this document, the analog front-end uses a mixer to translate the channels to frequency for transmission.

As an illustration, signal 214 is a frequency domain representation of a signal. In this illustration, the center band is wider than the side bands and may represent two contiguous channels that are available for use by the system. In various examples, the system applies the digital mask 310 (or a collection of digital masks 310, one for each antenna over which the signal 214 is being transmitted) to filter out all frequencies that are outside of a specific band of frequencies, for example, the frequencies that are outside of the UHF band of channels 21-35 and the UHF band of channels 39-51.

The identification of which channels are allowed and which channels are disallowed is provided by a spectrum sensor device 312. The spectrum sensor device 312 may be a component of a digital signal processor that receives from an analog front-end 316 one or more bands of channels (e.g., the entire bands of channels 21-35 and 39-51). The spectrum sensor may analyze the one or more bands to identify those channels that are available, for example, by performing an FFT algorithm on the bands and identifying UHF channels on which the received power level of transmissions does not exceed a threshold value. The spectrum sensor 312 may send information to the digital mask 310 identifying which of the channels are available. The digital mask 310 may include code that specifies, for a particular combination of available channels, how to shape a precoded signal 307 so that the signal is transmitted over only the available channels. The digital mask 310 may then transform the frequency domain representation of the signal back into a time domain representation, for example, by performing an inverse FFT (e.g., as illustrated by box 216 in FIG. 2).

The digital to analog converter 314 may transform the digital signal into an analog signal. Thereafter, the analog front-end 316 may clean up the newly-generated analog signal for transmission by an antenna. In general, the analog front end 316 may apply a low pass filter to remove any high-frequency artifacts that may have been created during the generation of the analog signal, including any aliases of the channelized signal (which may be located at base band or an intermediate frequency). A mixer may be applied to the channelized signal to move the channelized signal to a higher frequency range. The channelized signal (at RF) may then be split, and a first component may be filtered to isolate the UHF band of channels 21-35, while a second component may be split to isolate the UHF band of channels 39-51. Each isolated band may be provided for transmission by a different antenna. The analog front end is described with more detail throughout this document (including with reference to FIG. 11 and under the "Transmitter Architecture" header below).

Accordingly, each channelizer outputs an analog signal that is at frequency and that has been properly channelized to transmit over the available frequencies. In some examples, each of the analog signals may encode information for multiple mobile devices over the same frequency resource (e.g., a same discontiguous set of available UHF channels). Each output analog signal may be provided to an individual antenna in the antenna array 322.

During an uplink time slot, the antenna array 322 may receive an incoming analog signal. The analog front end 316 may filter out a band of channels (e.g., a contiguous set of UHF channels), and provide the band to an analog to digital converter 318 for transmission to a digital signal. The digital signal may be provided to a DSP for performing spectrum sensing (as described above) and optionally digital masking to remove frequency components that correspond to channels that are not available. The digital signal, which may have been masked, is provided to a detector 324. The detector 324 can receive digital signals from each of multiple channelizers. A forward error correction decoder 326 may perform a dispreading operation to generate a serial first stream of data from a second stream of data at a higher frequency, in which the first stream of data was encoded.

FIG. 3 illustrates an example block diagram of a transmitter architecture, but a similar system may be used to receive signals over discontiguous portions of spectrum. As an illustration, an antenna array may receive communication signals, and a set of filters may isolate the relevant bands of UHF channels (but may not channelize individual channels). The relevant bands may be digitized by one or more A/D converters, which may provide the resulting digital information to one or more digital signal processors.

A digital signal processor may have previously sensed all of the channels to identify those that are available, and based on this information, may perform a filtering operation to pass through only those channels on which the system has determined to transmit over. A dispreading operation may be performed on the passed through channels to recover the data stream that was transmitted by a remote device. This described process may occur for each of the multiple degrees of freedom by circuits operating in parallel.

In various examples, the communication system periodically performs spectrum sensing to determine if additional available channels have become available. If so, the system may use the additional channels. Additionally, the system may be able to identify if a third-party device has begun to transmit over one of the channels that the system had previously determined was available. A third party device may be a device that is not communicating over the communication system. A third party device may be identified as a device that is transmitting over a specified power level on a given channel. A third party device may also be identified as a device that is transmitting data over a given channel that the communication system cannot decode using the FSSS code that has been agreed upon by the base station and mobile devices in the communication system.

In various examples, the digital signal processing device (DSP) can include one or more devices that perform signal processing in a digital form. Example devices include digital signal processors, field-programmable gate arrays (FPGAs), application specific integrated circuits (ASICs), general purpose processors, etc.

I. Overview of Communication System

Figure 4:
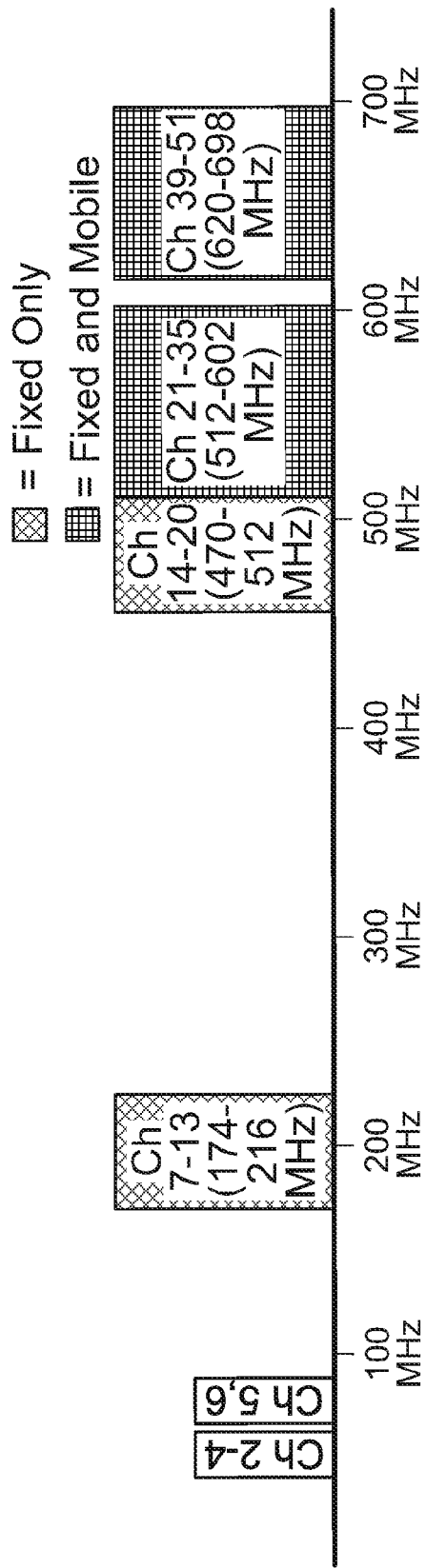
FIG. 4 is an illustration of United States television whitespace bands opened to unlicensed use.

In November 2008, the United States FCC voted to allow unlicensed use in the spectrum designated for TV broadcast use. In the order, the TV bands are broken up into two categories of device use: fixed devices and personal portable devices. As shown in FIG. 4, all channels (except 3, 4, and 37) are opened to use by fixed devices, while only channels 21-51 (except 36-37) are available for mobile (personal portable) use. The opening of the TV bands to unlicensed use in the United States offers an opportunity to build very wideband systems, capable of high data rates, high capacity, and long range communication links. To take maximum advantage of the wide bandwidths available (up to 90 MHz of contiguous spectrum), the spectrum allocation techniques and wideband transceiver architectures described throughout this document were needed.

Looking at these available channels, it is the UHF band that offers the most value. Channels 2, 5, and 6 offer great propagation, but are not very wide, are heavily utilized by TV broadcast, and have very loud neighbors in FM radio broadcast. Channels 7-13 offer some sizeable BW and good propagation, but are heavily utilized by TV broadcast and are more than an octave away from the UHF band, requiring a separate antenna and front-end. For these reasons, the system uses channels 21-51 where mobile use is permitted. The architectures presented focuses on these channels, but can be modified, by changing the sampling rate, to include channels 14-20 or other country's channelization schemes.

Focusing on channels 21-51, there is the potential for up to 168 MHz of available spectrum (use of channels 36-38 are restricted), but individual channel availability is determined by the presence (or lack there of) of primary users (TV and Wireless Microphones.) Thus, the channel availability varies wildly based on location. In rural areas the system may be likely to have large blocks of contiguous channels. In urban areas, the available channels may be broken up into smaller blocks, but may still offer substantial amounts of bandwidth in aggregate. Further, where channels are available, there is the potential of a large interferer to be present in that channel. Thus, the described transceiver architecture may be flexible enough to accommodate the variety of channel lineups and linear enough to deal with the interferers that the architecture may face.

II. Front-End Architecture

Some design choices may be determined based on the regulations. First, since the system is required to do spectrum sensing on every channel before use and the channels availability is variable, a TDD (time division duplex) system may be an appropriate implementation.

A. Traditional Heterodyne Architecture

Figure 5:
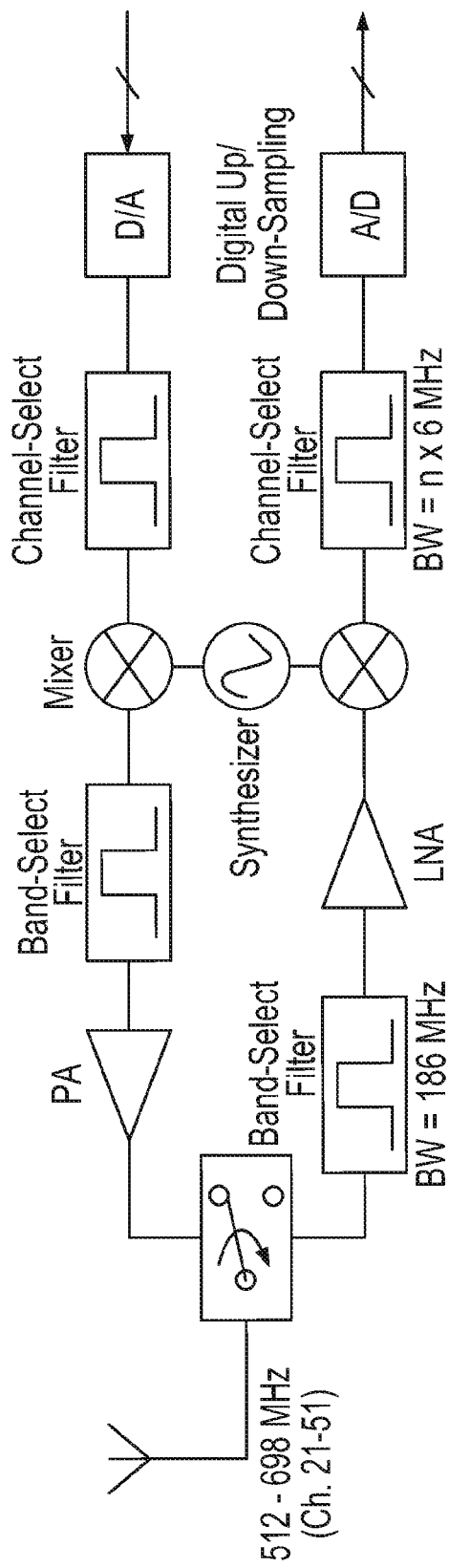
FIG. 5 is a diagram of a traditional heterodyne architecture applied to a TV band.

Given the current 6 MHz channelization of the band, a first architecture that could be considered is a heterodyned system with a 6 MHz final bandwidth as shown in FIG. 5. A synthesizer with 6 MHz steps takes care of hopping between channels and a quality IF (intermediate frequency) filter (e.g., SAW filter) can attenuate any neighboring interferers.

But the system for this architecture may be limited to one channel at a time, for both spectrum sensing and actual channel use, requiring retuning the front-end to take advantage of other channels. Especially for sensing, where the system tracks of the availability of these other channels, the dwell time per channel is limited by how many channels are being tracked. Improvement can be made by adding wider bandwidth (BW) IF filters (i.e. n×6 MHz), but this can make for more filters that are increasingly hard to build (and expensive) as the bandwidth increased. Further, any inefficiency in the synthesizer (i.e. tuning time) further limits time per channel. Thus, there can be an inherent opportunity cost with the heterodyne architecture when multiple, non-contiguous channels are available (which may be the 90% use case.)

Further, the heterodyne architecture may not offer high linearity. Since the 6 MHz (or n×6 MHz) filtering is done at some IF, the large potential interferer may still be present at the mixer, which may largely limit the linearity of the transceiver. Thus, the IF filter may not do much for the overall linearity.

Given the steep adjacent channel power ratio (ACPR) requirements (55 dBc in first 100 kHz of adjacent channel), some amount of guard band is required within the channel you wish to use in order to meet the ACPR in the neighboring channel. If this guard band is set by the IF filter, it is fixed and the system cannot take advantage of the availability of two or more channels being neighboring channels. Thus, in the extreme where the system is deployed in an area with 15 contiguous channels available (ch. 21-35), there are 28 guard bands (14 boundaries×2 sides/boundary) that may be unnecessary. Assuming a conservative guard band of 0.25 MHz, that is 7 MHz of available spectrum being wasted.

Finally, should similar spectrum become available in other countries, that have different channel bandwidths and allocations, making this architecture work for multiple channelization schemes may increase the complexity.

In summary, given that multiple channels may be available (and that the system may need to sense other channels to see if they become available) resulting in $2^{28}$ combinations, channelizing the front-end architecture may limit the efficiency of the system and may not offer any improvements in linearity.

B. Single Channel, Homodyne Architecture

The appeal of heterodyne architectures may be diminished by the need for high percentage filters (if downconverting) or more mixing stages that lower linearity (if upconverting before downconverting.) Thus, a Homodyne (single conversion) architecture was considered in order to minimize non-linearities, caused by mixing.

Similar to the Heterodyne architecture, the first design choice that arises is channelization. Any channelization scheme may limit the number of channels that can be used simultaneously, requiring exotic filtering. Thus, the system was designed to consider the entire band as a single channel to the RF front-end and perform any channelization digitally. This reduces the filtering requirements (and dominant cost) of the RF and allows the digital signal processor (DSP) access to all channels simultaneously. A cost of this choice may be in increased ADC/DAC performance as the ADCs/DACs may need sampling rates at (or better than) twice the channel BW and dynamic ranges sufficiently high to deal with loud interferers and meet the transmit (TX) mask requirements. Recent performance advancements in ADCs and DACs have far outpaced those of RF filters and mixer, potentially justifying this design choice. Further, ADCs and DACs have a wider use, improving the potential for further performance improvements and breakthroughs.

Receiver Architecture

Figure 6:
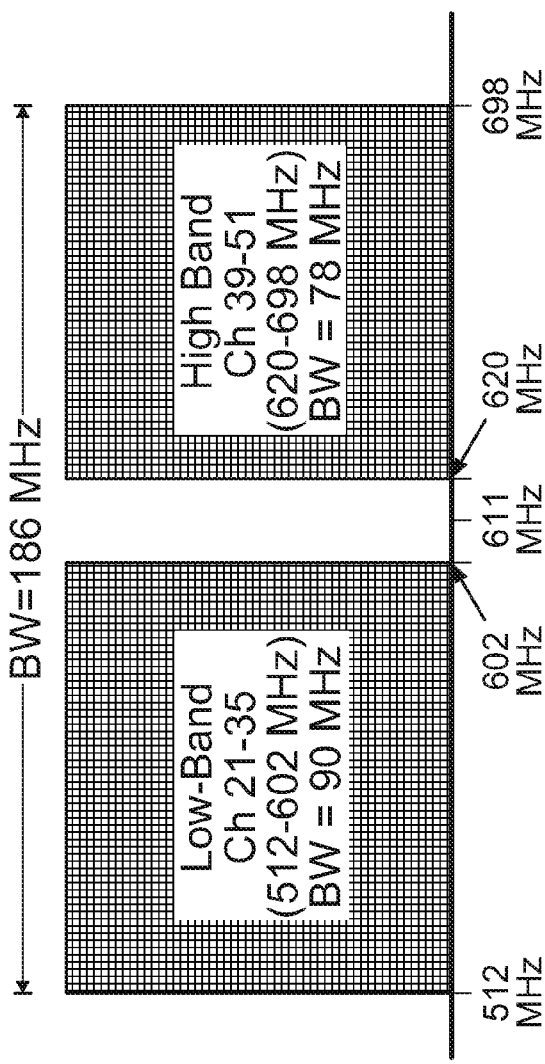
FIG. 6 is an illustration of the UHF mobile-use band.

Looking again at the UHF band, and specifically at channels 21-51 (512-698 MHz), the total bandwidth is 186 MHz (FIG. 6). Some guard band (or oversampling) may be needed to prevent aliasing. Thus, assuming approximately 20 MHz of guard bands (which can still require a very sharp RF filter), results in a total BW of 225 MHz. By Nyquist, the system may need to sample twice this BW, requiring a single ADC/DAC to sample at 450 Msps. For the DAC, this is achievable in commercial parts, with sampling rates available into the Gsps range with sufficient dynamic range. However, commercially available ADCs with sufficient dynamic range may be limited to a range of 250-300 Msps.

To get around this ADC sampling limit on the receiver, the band may be broken into two (or more) sub-bands, and the bands may be sampled in parallel. Conveniently, under the US FCC whitespace regulations, there is a natural break at roughly the halfway point in the band. Channels 36-38 are reserved for use by radio astronomy and wireless microphone users and are unavailable for use by whitespace devices. Thus, there are 2 natural sub-bands (FIG. 6): channels 21-35 (512-602 MHz) and channels 39-51 (620-698 MHz). These bandwidths are sufficiently narrow (90 MHz and 78 MHz, respectively) to be sampled using available 250 Msps ADCs. For simplicity and to minimize clocks, we have chosen to sample both bands at the same rate.

Given the proximity of these 2 bands, analog filtering (shown with a single dashed line on FIG. 7) is needed to isolate the 2 subbands since the alias of each band falls in the other band. The analog filtering requirements are dominated by the rejection required to maintain isolation to across the band gap. Within each sub-band, digital filtering (shown with a dot-dashed line in FIG. 7) can be used to channelize as needed and mask off (>55 dBc ACPR) the channels that are not available to the device, including channels 36-38.

Figure 8:
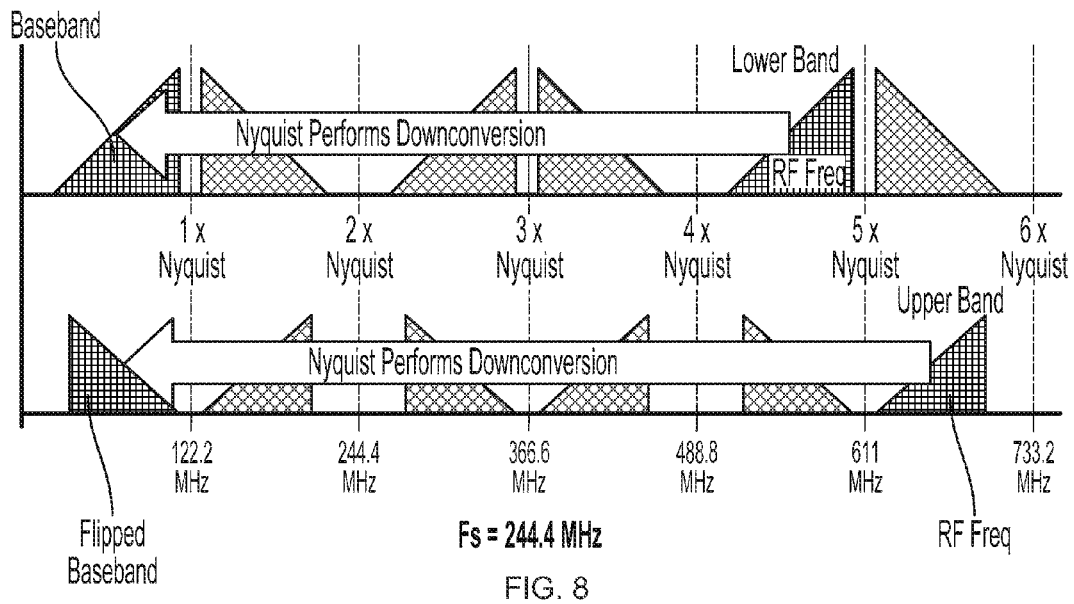
FIG. 8 is an illustration of sub-band downconversion via aliasing.

Further, given this analog filtering to isolate the 2 band, proper selection of the sampling frequency for the parallel ADCs may allow for downconversion (via aliasing) in the ADC, removing the need for an analog mixer. As illustrated in FIG. 8, if a sampling rate ($f_s$) is selected such that an integer multiple of the Nyquist frequency—$f_{Ny}$ ($f_{Ny}=f_s/2$)—falls within the band gap (602-620 MHz) and at the frequency of maximum isolation between sub-bands, each of the sub-bands will alias to baseband in isolation. The lower sub-band simply translates, the equivalent of low-side injection mixing, allowing it to be used without modification. The high sub-band is inverted in frequency, the equivalent of high-side injection mixing, requiring the DSP to invert before use.

Figure 7:
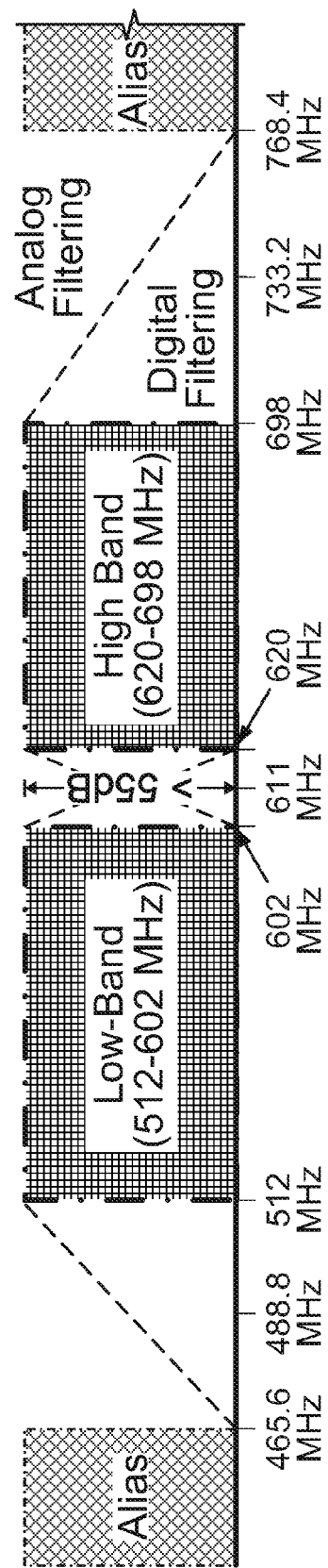
FIG. 7 is an illustration of sub-band sampling and filter requirements.

As shown in FIGS. 7 and 8, the system uses 244.4 Msps as the sampling rate to meet the Nyquist requirements for each band and to place the aliasing point at 11 MHz ($5 \times f_{Ny}$), in the center of the sub-band gap.

With this solution, sampling is done at RF, eliminating the need for a mixer in the receiver and removing a dominant source of non-linearity for particular embodiments. Further, the high-power LO required to drive high linearity mixers is replaced by a low power clock to drive the ADC, reducing the possibility of leakage. There are plenty of high-speed ADCs that have analog input bandwidths greater than the 700 MHz required for this application.

Figure 9:
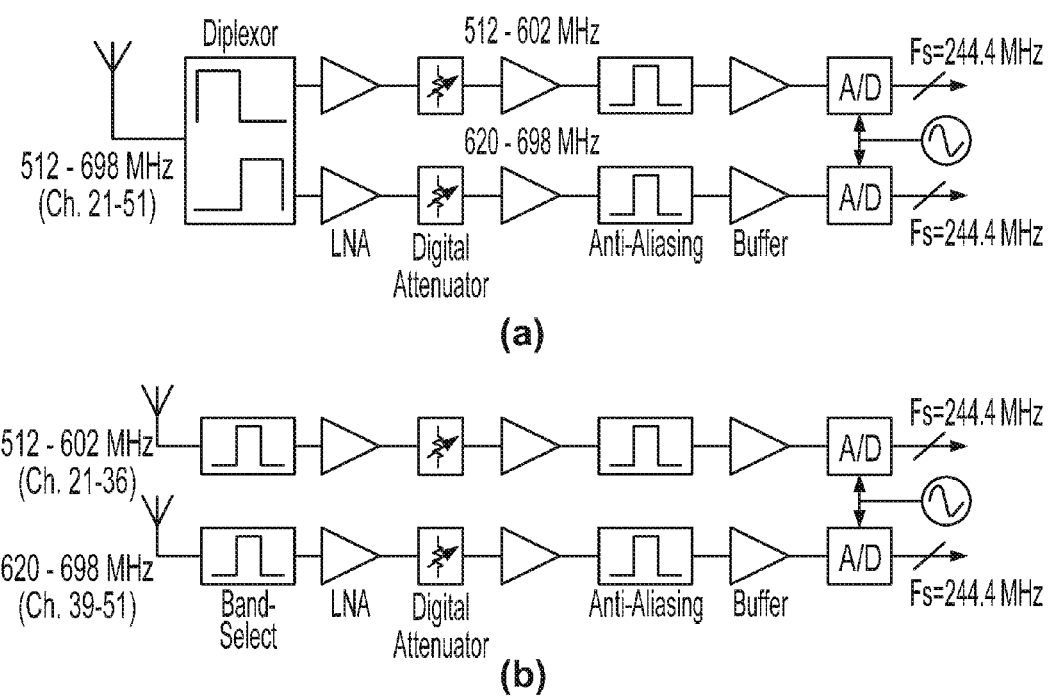
FIG. 9 is an illustration of sub-band receiver architectures for (a) a single antenna, diplexed system, and (b) a multiple antenna, band-select system.

The resulting receiver architectures are shown in FIG. 9. Since the filters are high percentage BW (16% for low-band, 14.5% for high-band), any SAW implementation may be high loss (~−10 dB), reducing the likelihood of a single front-end SAW filter. Rather, to maintain the 55 dB isolation between bands, two stages of filtering are used: a low-loss ceramic filter/diplexor before the low noise amplifier (LNA) for band-selection and a high rejection, anti-aliasing filter (either ceramic or SAW) further back in the receiver. If a single antenna is desired, the front-end filtering can be implemented with a diplexer. If two antennas are selected for use, which may be more efficient in terms of size, the front-end filters can be simplified to be standard bandpass designs. Further, given the potential for large interferers and limited dynamic range of the ADC, a digital attenuator is needed to tune the incoming signal to full scale on the ADC.

Transmitter Architecture

Figure 10:
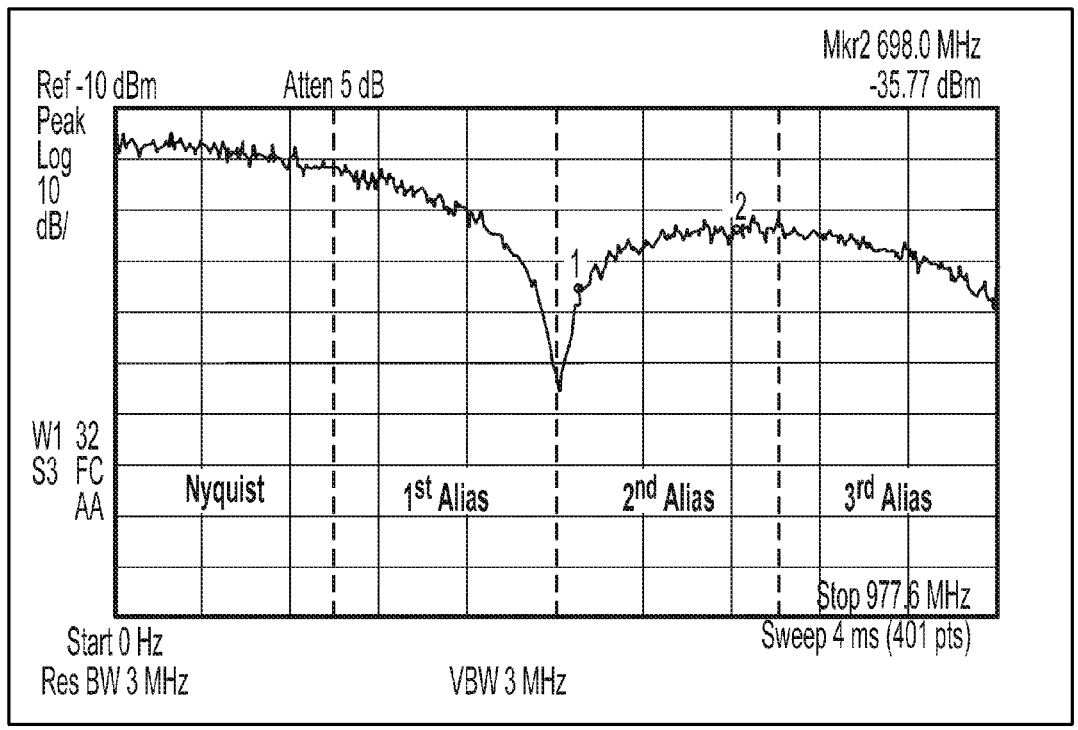
FIG. 10 is an illustration of the white noise transfer function of a digital to analog converter.

On the transmitter side, higher speed parts with sampling rates in the Gsps may be available, but a disadvantage may be that the aliases roll off with $|\sin c(fs)|$ (FIG. 10). Since the second alias may be significantly attenuated, when compared to the baseband, the effective dynamic range at the RF frequency may be reduced, making producing the 55 dBc notches required in occupied channels difficult. Thus, for the transmitter, a mixer is used to translate the DAC output to the desired band.

Because DACs provide sufficient sampling rates to handle the entire band, the sub-band approach may not be needed, but the approach may offer some advantages. Most importantly, the sub-band approach offers the ability split the output power across two PAs that can be independently controlled. Two PAs at half the power opens up a greater availability in parts and independent control that can offer power control advantages. As an example, the system has some number channels available in the lower sub-band that is sufficient for the system's present communication needs, the system may not need to keep the upper subband powered up, saving on power consumption (and battery life for mobile devices). Second, the 16%/14% bandpass filters needed for the sub-band design may be easier to implement than the 31% BPF required for the whole band. Further, the bandpass filters/diplexers that are needed are already available in the receiver design and can be shared since the system is TDD. Thus, in some implementations, at RF the sub-band architecture has been maintained.

Figure 11:
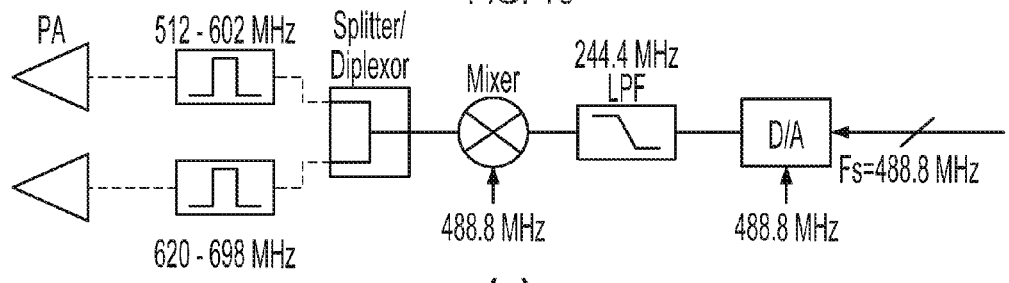
FIG. 11 is a diagram of sub-band transmitter architectures for (a) a single, full-rate digital to analog converter architecture, and (b) a parallel, half-rate digital to analog converter architecture.
Figure 11:
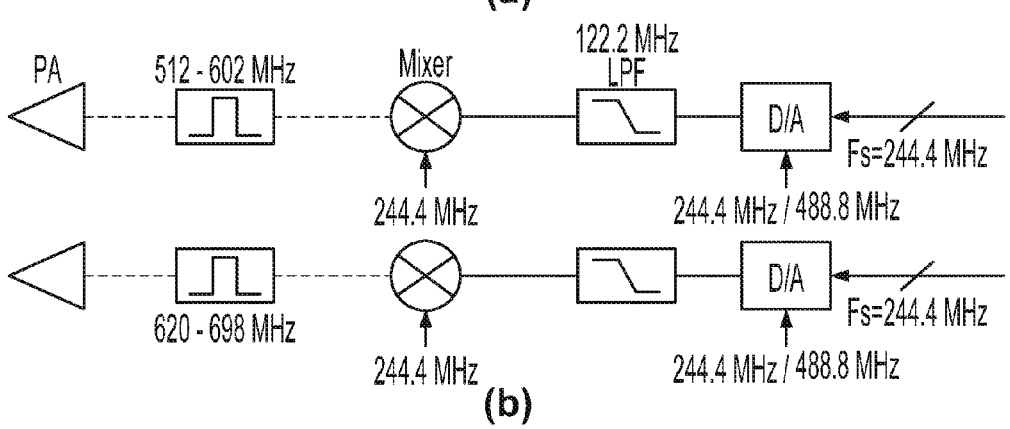

At baseband, however, there is the choice to run either a single DAC or 2 DACs in parallel at half the rate (FIG. 11). The primary difference between the two is the clock rate, but the 2 architectures may use different mixing solutions.

Given that the DACs may be able to handle the full rate needed to synthesize the entire band, the single DAC (FIG. 11a) offers a single interface and a straightforward mixing scheme (FIG. 12a), where a single mixer and LO upconvert to RF. At RF, the signal can be split or diplexed into sub-bands. This solution is straightforward, but may requires a full rate interface to the devices driving the DAC.

Figure 12:
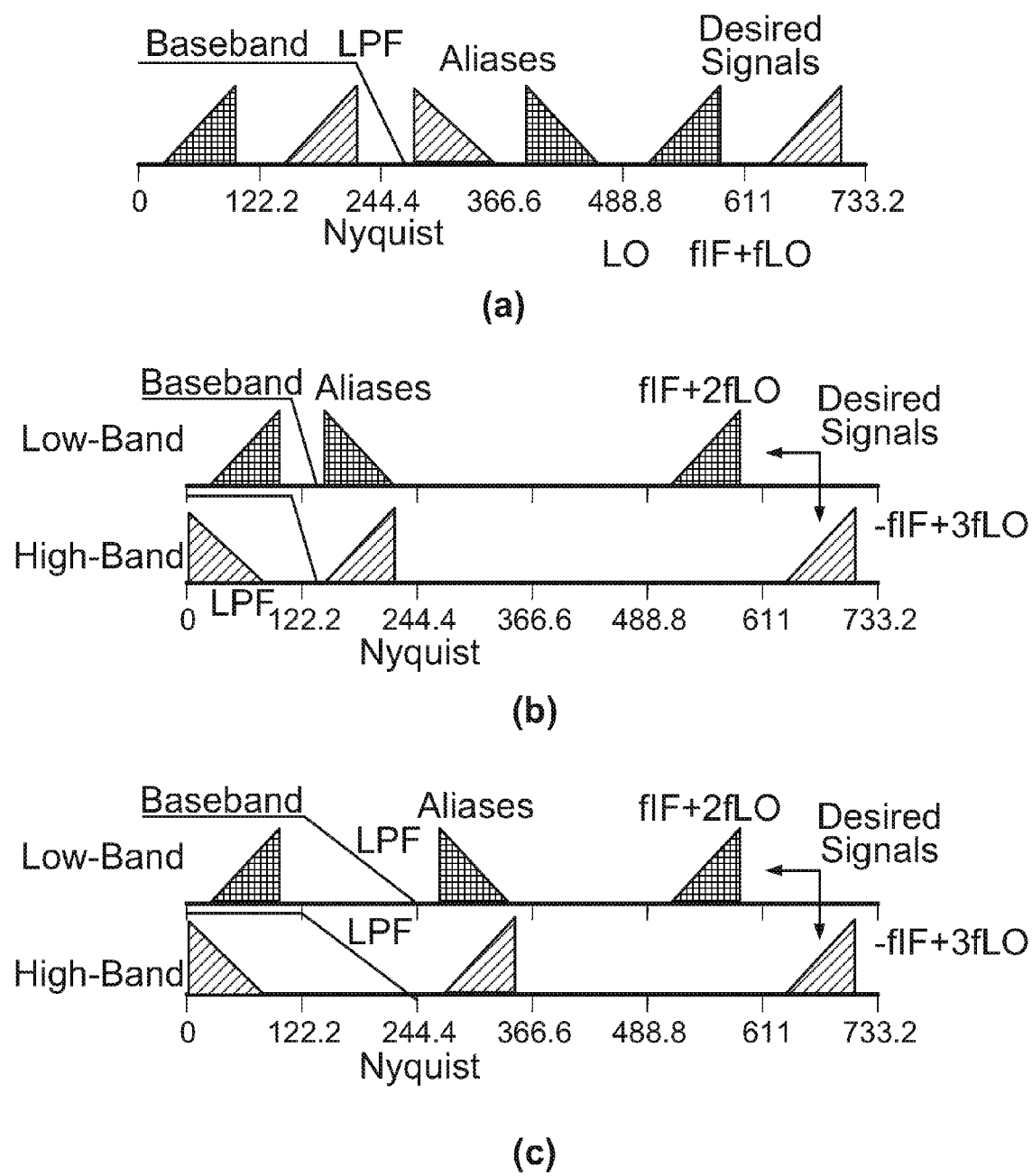
FIG. 12 is a diagram of frequency plans for sub-band transmitter architectures.

The Parallel, Half-rate DAC architecture (FIG. 11 b) offers a half rate interface, but requires a more elaborate mixing scheme (FIGS. 12b-c). While creating twice the I/O, the reduced rate from the two DAC solution will likely save power and reduce timing constraints on the device driving the DAC(s). The two DAC solution also has the advantage of independent control of each sub-band, allowing the system to turn off a subband if it is not needed. A complication to this architecture is in the mixing scheme and baseband filtering.

For mixing, since both sub-bands are synthesized at baseband, they need to be translated in frequency by a different amount. This can be done with a single LO by utilizing different mixer products ($2f_{LO}+f_{IF}$ for low-band, $3f_{LO}f_{IF}$ for high-band), but the conversion loss for these products will differ, requiring some equalization. This scheme also flips the high-band signal, similar to the RX aliasing scheme, requiring the DSP to flip the high-band signal before synthesis.

For baseband filtering, the half-rate synthesis produces aliases that are 18 MHz (width of the gap between bands) apart (FIG. 12b), requiring sharp low-pass filters. However, many high speed DACs offer an interpolating feature that allows the data to run at half rate while the DAC clock runs at full rate (similar to oversampling in ADCs.) This moves the aliases up in frequency by $f_{DAC}/2$ (FIG. 12c), allowing for simpler filtering at baseband.

Either of these architectures are reasonable solutions and are more dependent on the nature of the digital architecture. This document continues with a discussion of the Parallel, Half-Rate DAC architecture, for the same of describing a system where the rates are equal.

Integrated Transceiver Architecture

Figure 13:
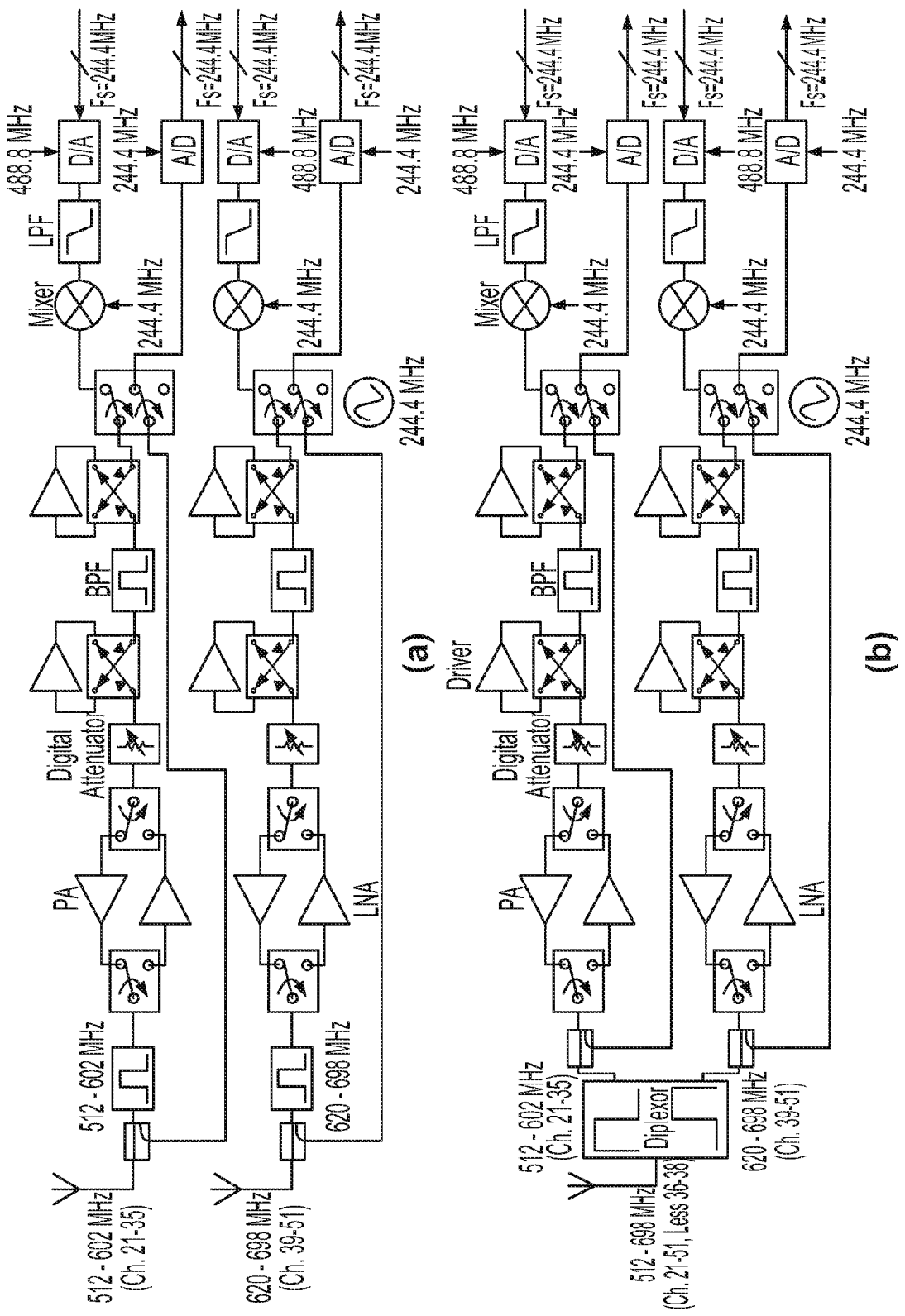
FIG. 13 is a diagram of integrated transceiver architectures for (a) a two antenna architecture, and (b) a single antenna, diplexed architecture.
Figure 14:
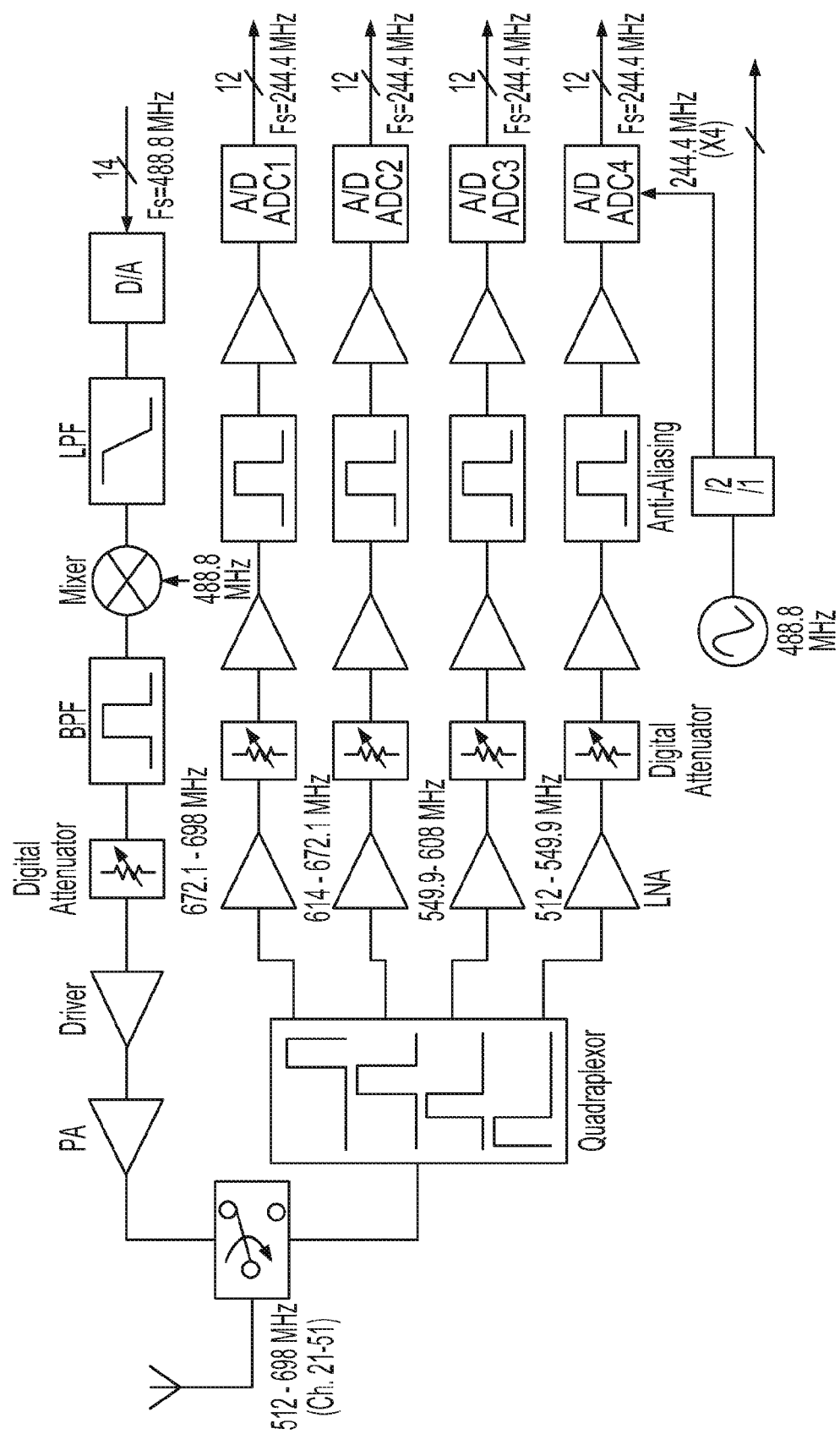
FIG. 14 is a diagram of an implemented architecture that includes a quadraplexed receiver and a single-band transmitter.

With the receiver and transmitter architectures selected, a system can be designed that exploits similarities between the two to come up with an integrated architecture (FIG. 13). Since the system implements TDD, a single chain can be used for both functions, minimizing the number of components and size. For components that are unidirectional, such as amplifiers, a dual pull, double throw (DPDT) switch can be used to change the direction on receive and transmit. The LNA and power amplifier (PA) may have different requirements and may be implemented as separate parts, so a pair of single pull, double throw (SPDT) switches is used to switch between the two.

Another function added with this architecture is a feedback path from the PA output to the A/D. Being able to sample the PA output enables the ability to implement digital predistortion, improving the linearity of the transmitted signal and decreasing the power consumption of the PA.

Also, as discussed previously, there is a choice in the configuration of the antenna and input filtering. While there may be antenna designs available for this band, designing an antenna to fit in a small form factor (e.g., a handset or netbook) is hard and may operate inefficiently given wide percentage bandwidth. Thus, a system with antennas, one for each sub-band, may provide better performance in the same size. For these size-constrained applications, the Two Antenna Architecture (FIG. 13a) may be selected. Alternatively, in applications where the cabling is more constraining than the antenna size (e.g., base stations and roof mounts), the Single Antenna Architecture in FIG. 13b may be preferable.

These architectures may be modified to include the other UHF stations (ch. 13-20) as well. Extending the low-band filters to include these channels would increase the bandwidth to 132 MHz, requiring an increased sample rate. A sample rate of 305.5 MHz (611 MHz/4×2), used on the ADCs and DACs may meet the Nyquist requirements and maintain the baseband alias in the ADCs. The 305.5 MHz sampling rate may also be used for the TX mixers, producing the desired mixer products ($2f_{LO}$-$f_{IF}$ for the low-band, $2f_{LO}$+$f_{IF}$ for the high-band). Finally, the baseband LPFs after the DAC may be extended to 152.75 MHz. Should other countries adopt similar rules, these architectures could be similarly modified or used as is, since the architectures are largely independent of channelization.

Many of the components in these architectures may be integrated. The LNA, switches, amplifiers, digital attenuator, and mixer may be integrated in a single chip which, adding in the SAW filter, could integrated into a single package.

In summary, these architectures offer a system access to all the available channels, simultaneously. This allows for simultaneous sensing and the ability to make use of any and all available channels. The sub-band architectures offer channel diversity, so the system is close to a TV transmitter, or some other device that overloads the front-end of one band, the system may still have the other band available, unaffected by the interferer. Similarly, if the system utilizes the 2 antenna architecture in a mobile device and a user somehow detunes one of the antennas, the other band may still be available. Finally, another advantage of these architectures is the flexibility it offers to the DSP, making the architecture a vehicle for novel PHY designs.

III. Implementation Results

The architectures discussed above is believed to be the best architecture for this application, and is being built. However, some of the tradeoffs discussed were not obvious when the hardware discussed below was built and refined after an initial implementation. Many of the concepts presented (i.e. sub-banding, mixer-free receiver by aliasing, and filtering schemes) are included in this earlier form.

A. Implemented Quad-Band Receiver Architecture

A difference in our initial implementation (FIG. 16) is that, for the receiver, each sub-band was broken in two, creating four quad-bands, and sampled at the same 244.4 MHz, for the purpose of 2× oversampling the signal. Thus, a quadriplexer and 4 narrower bandpass filters were implemented instead of a diplexer. Further, this design assumed the availability of channels 36 and 38, so the gap between bands is only 6 MHz (ch 37), making the antialiasing filters for the center 2 bands even more challenging. Since the sampling rates did not change, this design still aliased to baseband in the same way discussed previously.

Again, a motivation for this architecture was to achieve 2× oversampling, which may be useful depending on the design of the applications PHY layer. However, this quadband receiver design also yielded some other benefits including diversity against overload and independent band control. In the overload case, where the system is cosite to a large interferer, with this architecture the interferer will be isolated to 1 band (2 bands if right on boundary), leaving other bands to available for use. Similarly, if there is a large signal in one band that limits sensitivity, the AGC (Digital Attenuator) in the other bands are independently controlled. Thus, this architecture may be immune to jamming from a single (or small number) of interferers. Finally, the independent control provides the ability to save power by turning off the bands that are unavailable or unneeded.

A cost to this design is the quadraplexer, which performs well, but may be physically large and expensive. Further, the transition between the lower two bands (549.9 MHz) and the higher two bands (672.1 MHz) may occur within a TV channel, requiring additional effort to piece together digitally. Further, the rolloff of the 2 filters (within the quadraplexer) around this transition may create a ravine in the frequency response. Finally, running 4 parallel receive chains may double the size and power consumption compared to the 2 sub-band approached, but also double the IOs to the DSP.

In summary, if 2× oversampling is desired, this implementation provides a reasonable architecture, which could be implemented easier with a full 3 channel gap (versus the single channel gap), reducing the complexity of the filtering. However, if oversampling is not desired, this architecture can be reduced to the one discussed.

B. Implemented Transmitter Architecture

Given that the receiver was quadraplexed, the same could be performed with the transmitter, allowing reuse of the receiver filter, or the transmitter could be implemented in a single band. If 2× oversampling on the transmitter were desired, a quadraplexed scheme would be appropriate, but may use an elaborate mixing scheme.

Rather, the transmitter was implemented as a single band (FIG. 13), both at baseband and RF. This had the advantage that the synthesized signal came from one DAC, avoiding the construction of boundary channels with 2 DACs. Disadvantages included the high sample rate at the DAC (very convoluted, high-speed interface), a high percentage BW (31%) BPF, and a single PA that limited the linearity.

IV. Aliasing vs. Mixing

A significant feature of these architectures is that they may not require an analog mixer, simplifying the architecture and eliminating the potential spurs that mixers generate. The following analysis will show that it also improves linearity.

Figure 15:
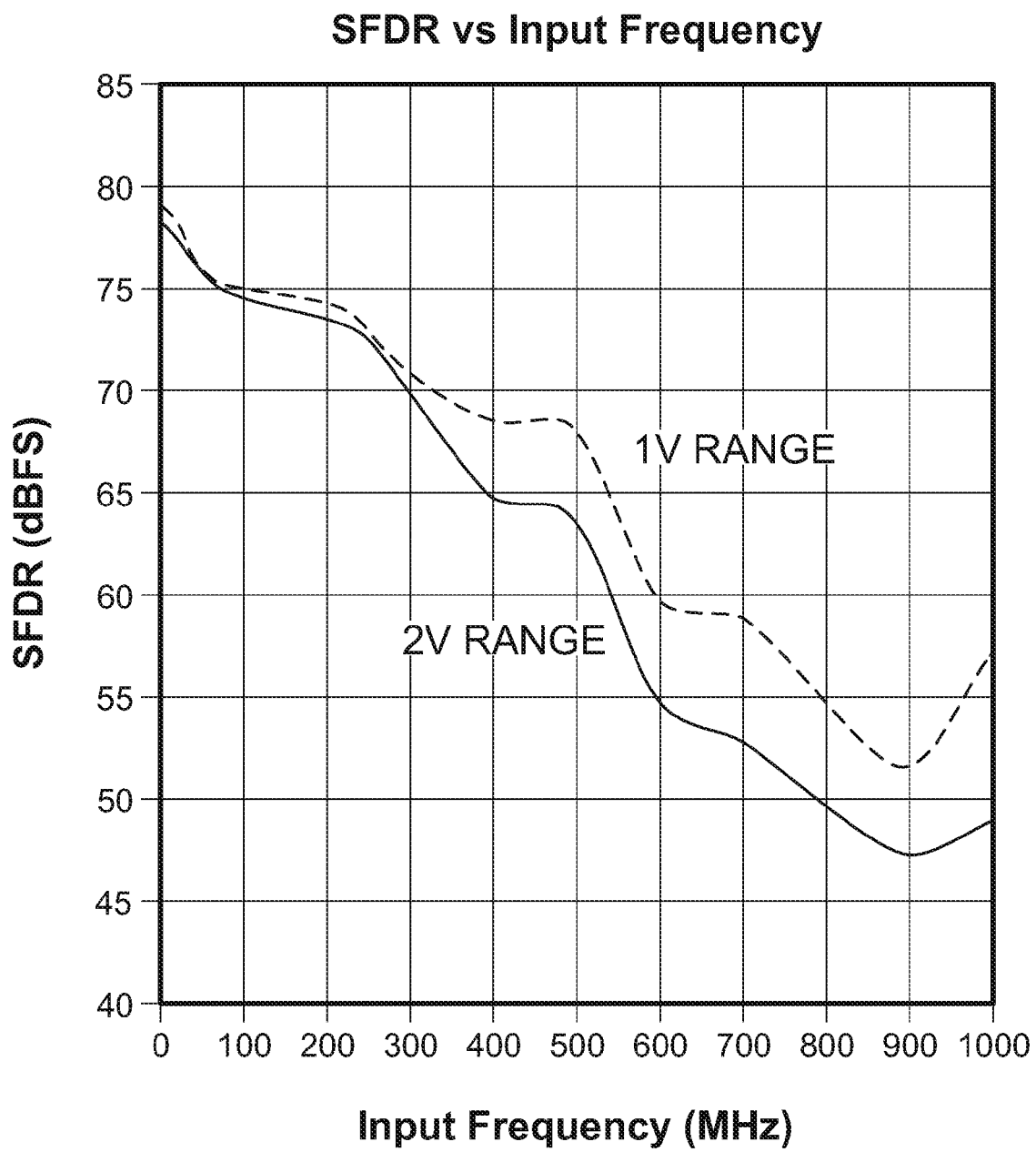
FIG. 15 is a graph showing the spurious free dynamic range vs. frequency from linear.

FIG. 15 shows the Spurious Free Dynamic Range for the LTC2242-12 (adapted from the datasheet for the LTC2242-12), which may degrade with input frequency. Thus, by sampling at RF instead of baseband, the linearity degraded from 74 dBFS at 122 MHz (the highest baseband frequency if the sub-bands were downconverted) to 59 dBFS at 700 MHz. However, the nonlinearities of the mixer, needed to downconvert to baseband, would degrade the linearity of the front-end, such that the front-end is the limiting component.

FIG. 15 shows the receive chain analysis for both cases, using the same components and resulting in the same front-end gain. The component input specifications are those for real parts, including the best performing mixer available, with an OIP3 of 35 dBm. The calculated values in each column include that component and all previous components. Thus, the values in the final column are for the entire chain.

Without a mixer (FIG. 16(a)), the RF front-end achieves a SFDR of 62.5 dB, which slightly exceeds the 59 dBFS achieved by the A/D. However, with the mixer (FIG. 16(b)), the front-end SFDR is limited to 58 dB compared to the 74 dBFS available in the A/D. Thus, with the best performing mixer available, the aliased scheme offers better linearity then the mixing scheme. Further, this performance gap is likely to increase as the improvement in A/Ds outpaces those of mixers due to greater demand and potential innovation V. Conclusion The opening up of the TV Whitespaces in the US offers an unprecedented opportunity for DSA and building truly wideband systems. This unlicensed spectrum opens the door to new, innovative, and agile systems that can operate with greater spectral efficiency, potentially outperforming traditional channelized systems.

RF front-ends can be designed and implemented using commercially available parts that can be easily integrated, offering instantaneous access to the entire band. Further, these architectures offer a great deal of flexibility, enabling DSA through the DSP's ability to adapt to different channelization schemes and take advantage of any channels that become available. This agile, wideband platform will enable greater bandwidths at greater ranges, opening up new use cases.

Figure 17:
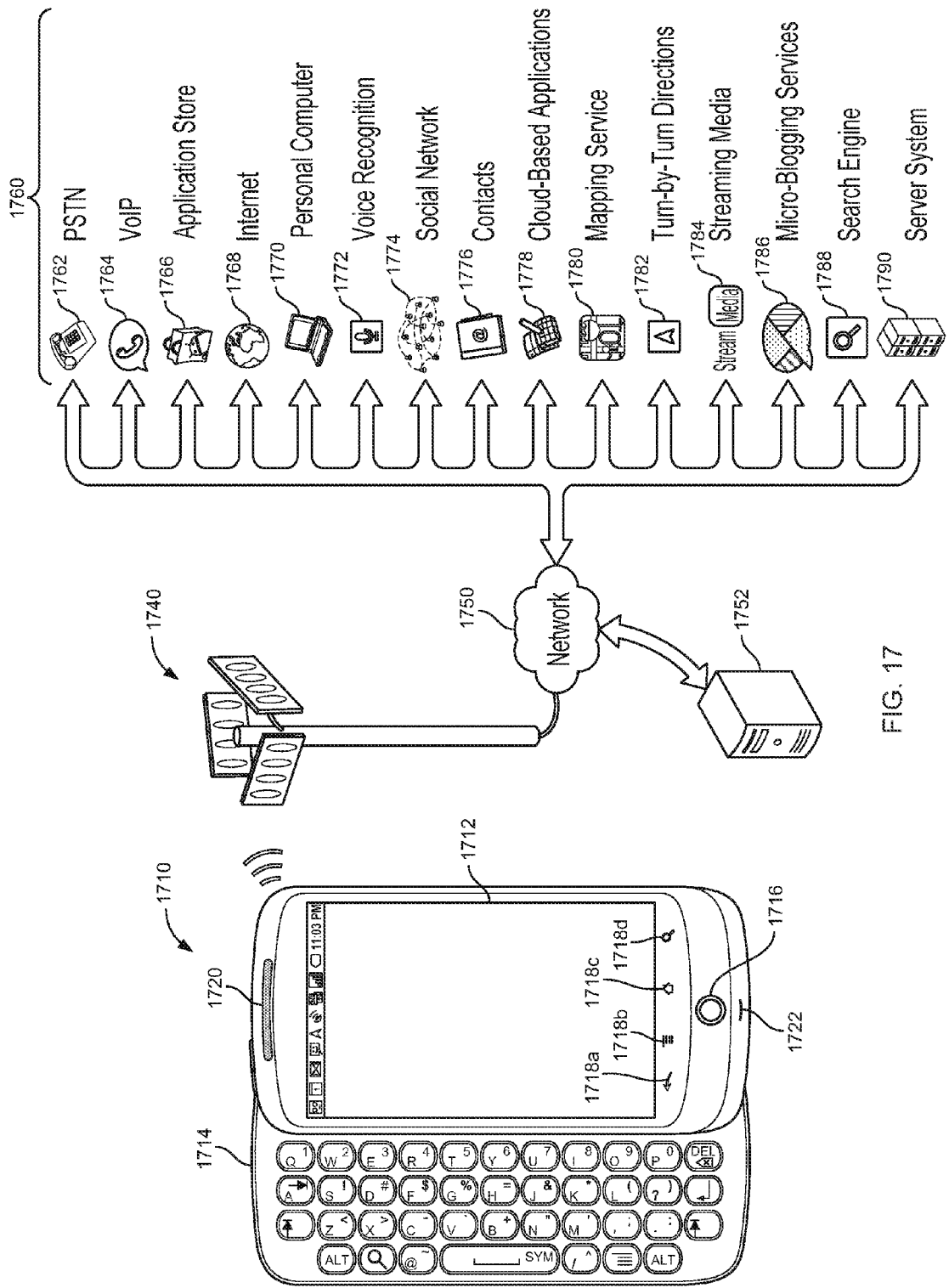
FIG. 17 is a conceptual diagram of a system that may be used to implement the systems and methods described in this document.

Referring now to FIG. 17, a conceptual diagram of a system that may be used to implement the systems and methods described in this document is illustrated. Mobile computing device 1710 can wirelessly communicate with base station 1740, which can provide the mobile computing device wireless access to numerous services 1760 through a network 1750.

In this illustration, the mobile computing device 1710 is depicted as a handheld mobile telephone (e.g., a smartphone or an application telephone) that includes a touchscreen display device 1712 for presenting content to a user of the mobile computing device 1710. The mobile computing device 1710 includes various input devices (e.g., keyboard 1714 and touchscreen display device 1712) for receiving user-input that influences the operation of the mobile computing device 1710. In further implementations, the mobile computing device 1710 may be a laptop computer, a tablet computer, a personal digital assistant, an embedded system (e.g., a car navigation system), a desktop computer, or a computerized workstation.

The mobile computing device 1710 may include various visual, auditory, and tactile user-output mechanisms. An example visual output mechanism is display device 1712, which can visually display video, graphics, images, and text that combine to provide a visible user interface. For example, the display device 1712 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 1712). Further, the mobile computing device 1710 may include one or more speakers 1720 that convert an electrical signal into sound, for example, music, an audible alert, or voice of an individual in a telephone call.

An example mechanism for receiving user-input includes keyboard 1714, which may be a full qwerty keyboard or a traditional keypad that includes keys for the digits '0-9', '*', and '#.' The keyboard 1714 receives input when a user physically contacts or depresses a keyboard key. User manipulation of a trackball 1716 or interaction with a trackpad enables the user to supply directional and rate of rotation information to the mobile computing device 1710 (e.g., to manipulate a position of a cursor on the display device 1712).

The mobile computing device 1710 may be able to determine a position of physical contact with the touchscreen display device 1712 (e.g., a position of contact by a finger or a stylus). Using the touchscreen 1712, various "virtual" input mechanisms may be produced, where a user interacts with a graphical user interface element depicted on the touchscreen 1712 by contacting the graphical user interface element. An example of a "virtual" input mechanism is a "software keyboard," where a keyboard is displayed on the touchscreen and a user selects keys by pressing a region of the touchscreen 1712 that corresponds to each key.

The mobile computing device 1710 may include mechanical or touch sensitive buttons 1718a-d. Additionally, the mobile computing device may include buttons for adjusting volume output by the one or more speakers 1720, and a button for turning the mobile computing device on or off. A microphone 1722 allows the mobile computing device 1710 to convert audible sounds into an electrical signal that may be digitally encoded and stored in computer-readable memory, or transmitted to another computing device. The mobile computing device 1710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 1710 may present a graphical user interface with the touchscreen 1712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1704. User-selection of the button may invoke the pre-defined action.

In some examples, the operating system provides a "desktop" user interface that is displayed upon turning on the mobile computing device 1710, activating the mobile computing device 1710 from a sleep state, upon "unlocking" the mobile computing device 1710, or upon receiving user-selection of the "home" button 1718*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 1710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 1712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 1710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 1710 may include other application modules and hardware. A call handling unit may receive an indication of an incoming telephone call and provide a user capabilities to answer the incoming telephone call. A media player may allow a user to listen to music or play movies that are stored in local memory of the mobile computing device 1710. The mobile telephone 1710 may include a digital camera sensor, and corresponding image and video capture and editing software. An internet browser may enable the user to view content from a web page by typing in an addresses corresponding to the web page or selecting a link to the web page.

The mobile computing device 1710 may include an antenna to wirelessly communicate information with the base station 1740. The base station 1740 may be one of many base stations in a collection of base stations (e.g., a mobile telephone cellular network) that enables the mobile computing device 1710 to maintain communication with a network 1750 as the mobile computing device is geographically moved. The computing device 1710 may alternatively or additionally communicate with the network 1750 through a Wi-Fi router or a wired connection (e.g., Ethernet, USB, or FIREWIRE). The computing device 1710 may also wirelessly communicate with other computing devices using BLUETOOTH protocols, or may employ an ad-hoc wireless network.

A service provider that operates the network of base stations may connect the mobile computing device 1710 to the network 1750 to enable communication between the mobile computing device 1710 and other computerized devices that provide services 1760. Although the services 1760 may be provided over different networks (e.g., the service provider's internal network, the Public Switched Telephone Network, and the Internet), network 1750 is illustrated as a single network. The service provider may operate a server system 1752 that routes information packets and voice data between the mobile computing device 1710 and computing devices associated with the services 1760.

The network 1750 may connect the mobile computing device 1710 to the Public Switched Telephone Network (PSTN) 1762 in order to establish voice or fax communication between the mobile computing device 1710 and another computing device. For example, the service provider server system 1752 may receive an indication from the PSTN 1762 of an incoming call for the mobile computing device 1710. Conversely, the mobile computing device 1710 may send a communication to the service provider server system 1752 initiating a telephone call with a telephone number that is associated with a device accessible through the PSTN 1762.

The network 1750 may connect the mobile computing device 1710 with a Voice over Internet Protocol (VoIP) service 1764 that routes voice communications over an IP network, as opposed to the PSTN. For example, a user of the mobile computing device 1710 may invoke a VoIP application and initiate a call using the program. The service provider server system 1752 may forward voice data from the call to a VoIP service, which may route the call over the internet to a corresponding computing device, potentially using the PSTN for a final leg of the connection.

An application store 1766 may provide a user of the mobile computing device 1710 the ability to browse a list of remotely stored application programs that the user may download over the network 1750 and install on the mobile computing device 1710. The application store 1766 may serve as a repository of applications developed by third-party application developers. An application program that is installed on the mobile computing device 1710 may be able to communicate over the network 1750 with server systems that are designated for the application program. For example, a VoIP application program may be downloaded from the Application Store 1766, enabling the user to communicate with the VoIP service 1764.

The mobile computing device 1710 may access content on the internet 1768 through network 1750. For example, a user of the mobile computing device 1710 may invoke a web browser application that requests data from remote computing devices that are accessible at designated universal resource locations. In various examples, some of the services 1760 are accessible over the internet.

The mobile computing device may communicate with a personal computer 1770. For example, the personal computer 1770 may be the home computer for a user of the mobile computing device 1710. Thus, the user may be able to stream media from his personal computer 1770. The user may also view the file structure of his personal computer 1770, and transmit selected documents between the computerized devices.

A voice recognition service 1772 may receive voice communication data recorded with the mobile computing device's microphone 1722, and translate the voice communication into corresponding textual data. In some examples, the translated text is provided to a search engine as a web query, and responsive search engine search results are transmitted to the mobile computing device 1710.

The mobile computing device 1710 may communicate with a social network 1774. The social network may include numerous members, some of which have agreed to be related as acquaintances. Application programs on the mobile computing device 1710 may access the social network 1774 to retrieve information based on the acquaintances of the user of the mobile computing device. For example, an "address book" application program may retrieve telephone numbers for the user's acquaintances. In various examples, content may be delivered to the mobile computing device 1710 based on social network distances from the user to other members. For example, advertisement and news article content may be selected for the user based on a level of interaction with such content by members that are "close" to the user (e.g., members that are "friends" or "friends of friends").

The mobile computing device 1710 may access a personal set of contacts 1776 through network 1750. Each contact may identify an individual and include information about that individual (e.g., a phone number, an email address, and a birthday). Because the set of contacts is hosted remotely to the mobile computing device 1710, the user may access and maintain the contacts 1776 across several devices as a common set of contacts.

The mobile computing device 1710 may access cloud-based application programs 1778. Cloud-computing provides application programs (e.g., a word processor or an email program) that are hosted remotely from the mobile computing device 1710, and may be accessed by the device 1710 using a web browser or a dedicated program. Example cloud-based application programs include GOOGLE DOCS word processor and spreadsheet service, GOOGLE GMAIL web-mail service, and PICASA picture manager.

Mapping service 1780 can provide the mobile computing device 1710 with street maps, route planning information, and satellite images. An example mapping service is GOOGLE MAPS. The mapping service 1780 may also receive queries and return location-specific results. For example, the mobile computing device 1710 may send an estimated location of the mobile computing device and a user-entered query for "pizza places" to the mapping service 1780. The mapping service 1780 may return a street map with "markers" superimposed on the map that identify geographical locations of nearby "pizza places."

Turn-by-turn service 1782 may provide the mobile computing device 1710 with turn-by-turn directions to a user-supplied destination. For example, the turn-by-turn service 1782 may stream to device 1710 a street-level view of an estimated location of the device, along with data for providing audio commands and superimposing arrows that direct a user of the device 1710 to the destination.

Various forms of streaming media 1784 may be requested by the mobile computing device 1710. For example, computing device 1710 may request a stream for a pre-recorded video file, a live television program, or a live radio program. Example services that provide streaming media include YOUTUBE and PANDORA.

A micro-blogging service 1786 may receive from the mobile computing device 1710 a user-input post that does not identify recipients of the post. The micro-blogging service 1786 may disseminate the post to other members of the micro-blogging service 1786 that agreed to subscribe to the user.

A search engine 1788 may receive user-entered textual or verbal queries from the mobile computing device 1710, determine a set of internet-accessible documents that are responsive to the query, and provide to the device 1710 information to display a list of search results for the responsive documents. In examples where a verbal query is received, the voice recognition service 1772 may translate the received audio into a textual query that is sent to the search engine.

These and other services may be implemented in a server system 1790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 18:
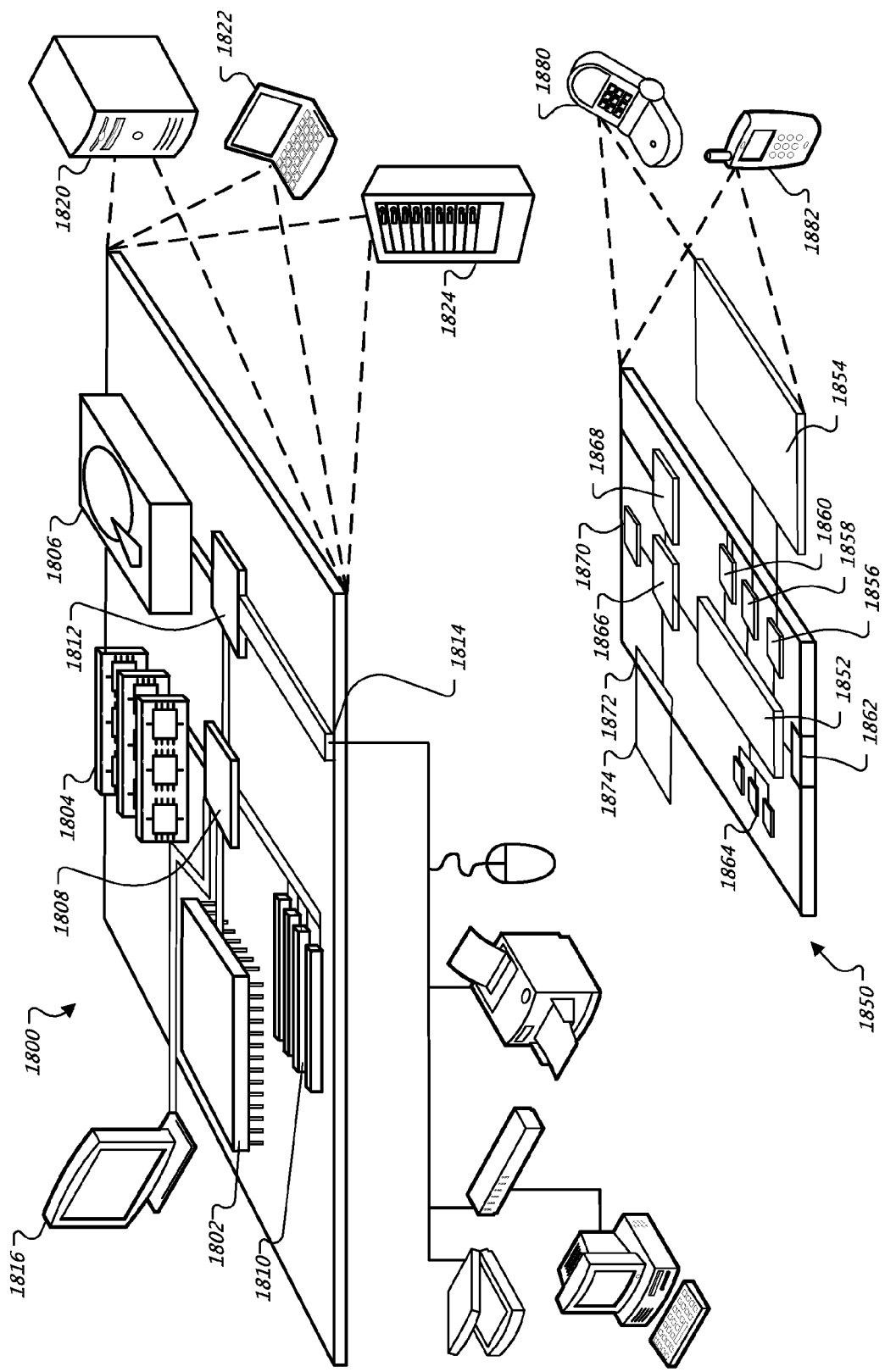
FIG. 18 is a block diagram of computing devices that may be used to implement the systems and methods described in this document, as either a client or as a server or plurality of servers.

FIG. 18 is a block diagram of computing devices 1800, 1850 that may be used to implement the systems and methods described in this document, as either a client or as a server or plurality of servers. Computing device 1800 is intended to represent various forms of digital computers, such as laptops, desktops, workstations, personal digital assistants, servers, blade servers, mainframes, and other appropriate computers. Computing device 1850 is intended to represent various forms of mobile devices, such as personal digital assistants, cellular telephones, smartphones, and other similar computing devices. Additionally computing device 1800 or 1850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. Each of the components 1802, 1804, 1806, 1808, 1810, and 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high speed interface 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 may also be another form of computer-readable medium, such as a magnetic or optical disk.

The storage device 1806 is capable of providing mass storage for the computing device 1800. In one implementation, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, display 1816 (e.g., through a graphics processor or accelerator), and to high-speed expansion ports 1810, which may accept various expansion cards (not shown). In the implementation, low-speed controller 1812 is coupled to storage device 1806 and low-speed expansion port 1814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as device 1850. Each of such devices may contain one or more of computing device 1800, 1850, and an entire system may be made up of multiple computing devices 1800, 1850 communicating with each other.

Computing device 1850 includes a processor 1852, memory 1864, an input/output device such as a display 1854, a communication interface 1866, and a transceiver 1868, among other components. The device 1850 may also be provided with a storage device, such as a microdrive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can execute instructions within the computing device 1850, including instructions stored in the memory 1864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1850, such as control of user interfaces, applications run by device 1850, and wireless communication by device 1850.

Processor 1852 may communicate with a user through control interface 1858 and display interface 1856 coupled to a display 1854. The display 1854 may be, for example, a TFT (Thin-Film-Transistor Liquid Crystal Display) display or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may be provide in communication with processor 1852, so as to enable near area communication of device 1850 with other devices. External interface 1862 may provide, for example, for wired communication in some implementations, or for wireless communication in other implementations, and multiple interfaces may also be used.

The memory 1864 stores information within the computing device 1850. The memory 1864 can be implemented as one or more of a computer-readable medium or media, a volatile memory unit or units, or a non-volatile memory unit or units. Expansion memory 1874 may also be provided and connected to device 1850 through expansion interface 1872, which may include, for example, a SIMM (Single In Line Memory Module) card interface. Such expansion memory 1874 may provide extra storage space for device 1850, or may also store applications or other information for device 1850. Specifically, expansion memory 1874 may include instructions to carry out or supplement the processes described above, and may include secure information also. Thus, for example, expansion memory 1874 may be provide as a security module for device 1850, and may be programmed with instructions that permit secure use of device 1850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852 that may be received, for example, over transceiver 1868 or external interface 1862.

Device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1868. In addition, short-range communication may occur, such as using a Bluetooth, WiFi, or other such transceiver (not shown). In addition, GPS (Global Positioning System) receiver module 1870 may provide additional navigation- and location-related wireless data to device 1850, which may be used as appropriate by applications running on device 1850.

Device 1850 may also communicate audibly using audio codec 1860, which may receive spoken information from a user and convert it to usable digital information. Audio codec 1860 may likewise generate audible sound for a user, such as through a speaker, e.g., in a handset of device 1850. Such sound may include sound from voice telephone calls, may include recorded sound (e.g., voice messages, music files, etc.) and may also include sound generated by applications operating on device 1850.

The computing device 1850 may be implemented in a number of different forms, as shown in the figure. For example, it may be implemented as a cellular telephone 1880. It may also be implemented as part of a smartphone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method for transmitting a data stream simultaneously over discontiguous channels of wireless spectrum, the method comprising:

generating, by a transmission system, a first digital data signal by combining an input digital data signal with another digital data signal that encodes a stream of data at a frequency that is higher than a frequency at which the input digital data signal encodes a different stream of data, the stream of data encoded by the input digital data signal having been designated for transmission to a single receiving device in a cellular communication system;

converting, by a digital signal processing apparatus of the transmission system, a second digital data signal that encodes the first digital data signal from a time domain to a frequency domain, so as to create a representation of the second digital data signal in the frequency domain that encodes the input digital data signal across a frequency band of a plurality of radio frequency channels that have been designated by a government governing body or an international agreement;

filtering, by the digital signal processing apparatus of the transmission system, the representation of the second digital data signal in the frequency domain to reduce, from the representation of the second digital data signal in the frequency domain, a power level of at least two discontiguous channels of the frequency band that correspond to channels of the frequency band that have been identified as occupied by transmissions from one or more third-party transmission systems that are not transmitting devices in the cellular communication system, so as to generate a filtered representation of the second digital data signal that encodes the input digital data signal across at least three discontiguous channels of the frequency band;

converting, by the digital signal processing apparatus of the transmission system, the filtered representation of the second digital data signal from the frequency domain the time domain, so as to generate a third digital data signal;

converting, by the transmission system, a fourth digital data signal that encodes the third digital data signal to a first analog signal that encodes the input digital data signal across the at least three discontiguous channels of the frequency band;

filtering, by the transmission system, a second analog signal that encodes the first analog signal to reduce, from the second analog signal, a power level of portions of the second analog signal that are outside of the frequency band, so as to generate a third analog signal, without use of channel hopping or channel bonding;

translating, by the transmission system, the second analog signal or the third analog signal to a higher frequency range; and wirelessly transmitting, by the transmission system and over the frequency band at the higher frequency range, a fourth analog signal that encodes the third analog signal.

2. The method of claim 1, wherein each of the at least three discontiguous channels of the frequency band is a channel of an Ultra High Frequency (UHF) band that is designated by the United States Federal Communication Commission.

3. The method of claim 1, further comprising identifying the at least two discontiguous channels of the frequency band by:

receiving, by the transmission system, a wireless signal;

detecting, by the transmission system, power levels of the wireless signal; and identifying, by the transmission system, the at least two discontiguous channels of the frequency band as being channels of the frequency band at which one or more of the power levels of the wireless signal exceed a threshold value.

4. The method of claim 1, wherein filtering the representation of the second digital data signal in the frequency domain includes creating 60 db cut offs for the at least two discontiguous channels of the frequency band.

5. A method for transmitting a data stream simultaneously over discontiguous portions of wireless spectrum, the method comprising:

receiving, by a transmission system, a first digital data signal that has been generated by combining an input digital data signal with another digital data signal that encodes a stream of data at a frequency that is higher than a frequency at which the input digital data signal encodes a different stream of data, the stream of data encoded by the input digital data signal having been designated for transmission to a single receiving device in a cellular communication system;

converting, by the transmission system, a second digital data signal that encodes the first digital data signal from a time domain to a frequency domain so as to create a representation of the second digital data signal in the frequency domain that encodes the input digital data signal across a frequency band;

filtering, by the transmission system, the representation of the second digital data signal in the frequency domain to reduce, from the representation of the second digital data signal in the frequency domain, a power level of at least two discontiguous portions of the frequency band that correspond to portions of the frequency band that have been identified as occupied by transmissions from one or more third-party transmission systems that are not transmitting devices in the cellular communication system, so as to generate a filtered representation of the second digital data signal that encodes the input digital data signal across at least three discontiguous portions of the frequency band;

converting, by the transmission system, the filtered representation of the second digital data signal from the frequency domain to the time domain, so as to generate a third digital data signal;

converting, by the transmission system, a fourth digital data signal that encodes the third digital data signal to a first analog signal that encodes the input digital data signal across the at least three discontiguous portions of the frequency band;

filtering, by the transmission system, a second analog signal that encodes the first analog signal to reduce, from the second analog signal, a power level of portions of the second analog signal that are outside of the frequency band, so as to generate a third analog signal; and wirelessly transmitting, by the transmission system, a fourth analog signal that encodes the third analog signal.

6. The method of claim 5, further comprising:

generating, by the transmission system, the first digital data signal by combining the input digital data signal with the another digital data signal.

7. The method of claim 5, wherein the another digital data signal encodes a pseudorandom sequence of digital values.

8. The method of claim 5, wherein combining the input digital data signal with the another digital data signal includes using direct sequence spread spectrum (DSSS) techniques.

9. The method of claim 5, wherein:

converting the second digital data signal from the time domain to the frequency domain includes applying a fast Fourier transform; and converting the filtered representation of the second digital data signal from the frequency domain to the time domain includes applying an inverse fast Fourier transform.

10. The method of claim 5, wherein each of the at least three discontiguous portions of the frequency band is one or more ranges of frequencies that have been designated as one or more respective channels by a government governing body or an international agreement.

11. The method of claim 10, wherein each of the at least three discontiguous portions of the frequency band is a one or more channels of an Ultra High Frequency (UHF) band that is designated by the United States Federal Communication Commission.

12. The method of claim 5, wherein the at least two discontiguous portions of the frequency band are a same bandwidth.

13. The method of claim 5, wherein filtering the representation of the second digital data signal is performed by a single digital signal processing apparatus.

14. The method of claim 5, wherein the transmission system wirelessly transmits the fourth analog signal without performing channel hopping or channel bonding with an analog signal that encodes the first analog signal.

15. The method of claim 5, further comprising translating, by the transmission system, a signal that encodes the first analog signal from baseband to a higher frequency range so that the fourth analog signal is wirelessly transmitted over the frequency band at the higher frequency range.

16. The method of claim 5, wherein filtering the representation of the second digital data signal in the frequency domain includes creating 60 db cut offs for the at least two discontiguous portions of the frequency band.

17. The method of claim 5, wherein wirelessly transmitting the fourth analog signal includes transmitting the fourth analog signal with a signal-to-noise ratio that is below 0 dbm.

18. The method of claim 5, further comprising wirelessly transmitting, by the transmission system and simultaneously with the wireless transmission of the fourth analog signal and through use of spatial division multiple access techniques, another analog signal for receipt by another single receiving device in the cellular communication system.

19. The method of claim 5, further comprising identifying the at least two discontiguous portions of the frequency band by:
  receiving, by the transmission system, a wireless signal;
  detecting, by the transmission system, power levels of the wireless signal; and
  identifying, by the transmission system, the at least two discontiguous portions of the frequency band as being portions of the frequency band at which one or more of the power levels of the wireless signal exceed a threshold value.

20. A system comprising:
  a power spreading subsystem to generate a first digital data signal by combining an input digital data signal with another digital data signal that encodes a stream of data at a frequency that is higher than a frequency at which the input digital data signal encodes a different stream of data, the stream of data encoded by the input digital data signal having been designated for transmission to a single receiving device in a cellular communication system;
  a digital signal processing apparatus to:
    (i) convert a second digital data signal that encodes the first digital data signal from a time domain to a frequency domain so as to create a representation of the second digital data signal in the frequency domain that encodes the input digital data signal across a frequency band;
    (ii) filter the representation of the second digital data signal in the frequency domain to reduce, from the representation of the second digital data signal in the frequency domain, a power level of at least two discontiguous portions of the frequency band that correspond to portions of the frequency band that have been identified as being occupied by transmissions of one or more third-party transmission systems that are not transmitting devices in the cellular communication system, so as to generate a filtered representation of the second digital data signal that encodes the input digital data signal across at least three discontiguous portions of the frequency band;
    (iii) convert the filtered representation of the second digital data signal from the frequency domain to the time domain, so as to generate a third digital data signal;
  a digital-to-analog converter to convert a fourth digital data signal that encodes the third digital data signal to a first analog signal that encodes the input digital data signal across the at least three discontiguous portions of the frequency band; and
  an analog transmitter arranged to:
    (i) receive the first analog signal;
    (ii) filter a second analog signal that encodes the first analog signal to reduce, from the second analog signal, a power level of portions of the second analog signal that are outside of the frequency band, so as to generate a second analog signal; and
    (iii) wirelessly transmit a third analog signal that encodes the second analog signal.

* * * * *